(12) United States Patent
Rao et al.

(10) Patent No.: US 11,593,406 B2
(45) Date of Patent: Feb. 28, 2023

(54) DYNAMIC SEARCH PARAMETER MODIFICATION

(71) Applicant: Capital One Services, LLC, McLean, VA (US)

(72) Inventors: Vivek Ranga Rao, McLean, VA (US); Shenpei Wu, McLean, VA (US); Aparna Keshavamurthy, McLean, VA (US); Madhu Sai Saranya Kachireddy, McLean, VA (US); Coty Kurtz, McLean, VA (US); Shailesh Kurdekar, McLean, VA (US); Krishnakumar Ramamurthy, McLean, VA (US); Prathyusha Ganta, McLean, VA (US); Indulekha Ghandikota, McLean, VA (US); Vishalvikrant Singh, McLean, VA (US); Jesse Gutierrez, McLean, VA (US); Alexandra Loucks, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 117 days.

(21) Appl. No.: 17/201,562

(22) Filed: Mar. 15, 2021

(65) Prior Publication Data
US 2022/0292117 A1 Sep. 15, 2022

(51) Int. Cl.
G06F 16/00 (2019.01)
G06F 16/28 (2019.01)
G06F 16/23 (2019.01)
G06N 3/08 (2023.01)
G06N 3/04 (2023.01)
G06F 9/54 (2006.01)

(52) U.S. Cl.
CPC ............ *G06F 16/285* (2019.01); *G06F 9/547* (2013.01); *G06F 16/2358* (2019.01); *G06F 16/2379* (2019.01); *G06N 3/0445* (2013.01); *G06N 3/0454* (2013.01); *G06N 3/08* (2013.01)

(58) Field of Classification Search
None
See application file for complete search history.

(56) References Cited

U.S. PATENT DOCUMENTS

2015/0019944 A1* 1/2015 Kalgi ............... G06Q 20/3552
715/205
2022/0201008 A1* 6/2022 Stergioudis ............ G06N 20/00

* cited by examiner

Primary Examiner — Anhtai V Tran
(74) Attorney, Agent, or Firm — Perkins Coie LLP

(57) ABSTRACT

In some embodiments, a number of inputs for a machine learning model may be dynamically scaled based on a record update. In some embodiments, an account record may be obtained based on an obtained record update, and a first model may determine a category value based on the account record. A graph that includes a node mapping to the account record may be obtained. In some embodiments, a threshold may be selected based on the category value, and the graph may be traversed via a set of paths to select nodes of the graph, such that the paths are based on the threshold. Record values associated with the set of nodes may be provided to a second model to determine whether the record update satisfies a set of criteria. If so, the record update may be stored in an aggregated set of record updates.

17 Claims, 8 Drawing Sheets

DYNAMIC SEARCH PARAMETER MODIFICATION

BACKGROUND

Records in a database are often updated via database transactions that are associated with other records. Quantities associated with the database transactions, such as amounts by which a value of a record changes, may often be used as inputs for various anomaly detection operations. These anomaly detection operations may often use indicated associations between records to track additional features or input values.

SUMMARY

Aspects of the invention relate to methods, apparatuses, media, and/or systems for detecting anomalies. After obtaining or detecting a database transaction, a computer system performs operations to determine whether the database transaction triggers any criteria indicating an anomaly. However, many anomalies may depend on values associated with a plurality of transactions, and operations to detect such anomalies may cause the computer system to search a set of records related to the transaction. Such operations may increase the computational cost and complexity of an operation. Moreover, a data system may expect to see more than one thousand, more than one million, more than one billion database transactions, or some other number of database transactions per day. Furthermore, the computational costs associated with criteria-checking may be exacerbated by the use of deep learning models or computationally expensive functions when determining whether a transaction is anomalous. Operations which increase the number of records to be searched or the time required to perform a search for records may thus increase the computational resources required to perform anomaly detection for systems that experience a large (e.g., more than 1000) number of transactions per day. In many scenarios, such obstacles may render implementations of machine learning operations or rule-based criteria-checking impractical in real-world operations for large data systems.

Methods and systems described herein may provide operations that may reduce the number of searches or increase the speed of record retrieval. As an example, such methods or related systems may accelerate the use of certain verification operations or even permit the use of new verification operations that were previously infeasible for real-world operations. Some embodiments may use a first machine learning model to determine a search parameter for a record identified by a transaction. Some embodiments may then use the search parameter to limit the number of related record values for consideration by another machine learning system or other decision system that may require more computational resources than the first machine learning model. Alternatively, or in addition, some embodiments may perform index-reversing operations or storage operations when storing and retrieving records related to database transactions.

In some embodiments, a database transaction request associated with a first transaction identifier may be obtained via a first API, where the database transaction request comprises a first value. A second API of a sequential transactions database may be accessed to store a transaction entry in the sequential transactions database based on the database transaction request. A reversed key may be generated by reversing the first transaction identifier. A third API of an aggregation database may be accessed to determine whether the aggregation database comprises any transaction aggregation records indexed by the reversed key. In response to a determination that the aggregation database does not store any transaction aggregation records indexed by the reversed key, a transaction aggregation record comprising the first value in the aggregation database may be generated. In some embodiments, the transaction aggregation record is indexed with the reversed key in the aggregation database. An update message indicating an update to the sequential transactions database may be obtained, where the update message comprises a second transaction identifier and a second value, and where the first API was not used to update the sequential transactions database. In some embodiments, the second transaction identifier may be reversed to reconstruct the reversed key. The aggregation database may be searched with the reversed key to retrieve the transaction aggregation record. The transaction aggregation record may be updated based on the second value. The transaction aggregation record may be sent to the destination API after updating the transaction aggregation record with the second value.

In some embodiments, a record update related to an account may be detected. An account record that identifies the account may be obtained based on a record update, where the record update indicates the account record and at least one other account record. An update history stored in the account record to a first machine learning model may be provided to assign a category value of a plurality of categories to the account record. A records graph comprising a node mapping to the account record may be obtained, where a graph edge associating adjacent nodes of the records graph indicates a set of updates identifying the adjacent nodes or a shared identifier between the adjacent nodes. A first path distance threshold of a plurality of path distance thresholds may be selected based on the category value, where the first path distance threshold is less than a second path distance threshold of the plurality of path distance thresholds. The records graph may be traversed via a set of paths to select a set of nodes of the records graph, such that 1) each respective path of the set of paths begins at the node mapping to the account record and 2) a maximum path distance of the set of paths is less than or equal to the first path distance threshold. A set of record values associated with the set of nodes may be determined, where each respective value of the set of record values is stored in a respective record identified by a respective node of the set of nodes. The set of record values to a second machine learning model may be provided to determine whether the record update satisfies a set of criteria. The record update may be stored in an aggregated set of record updates in response to a determination that the record update satisfies the set of criteria.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

Figure 1:
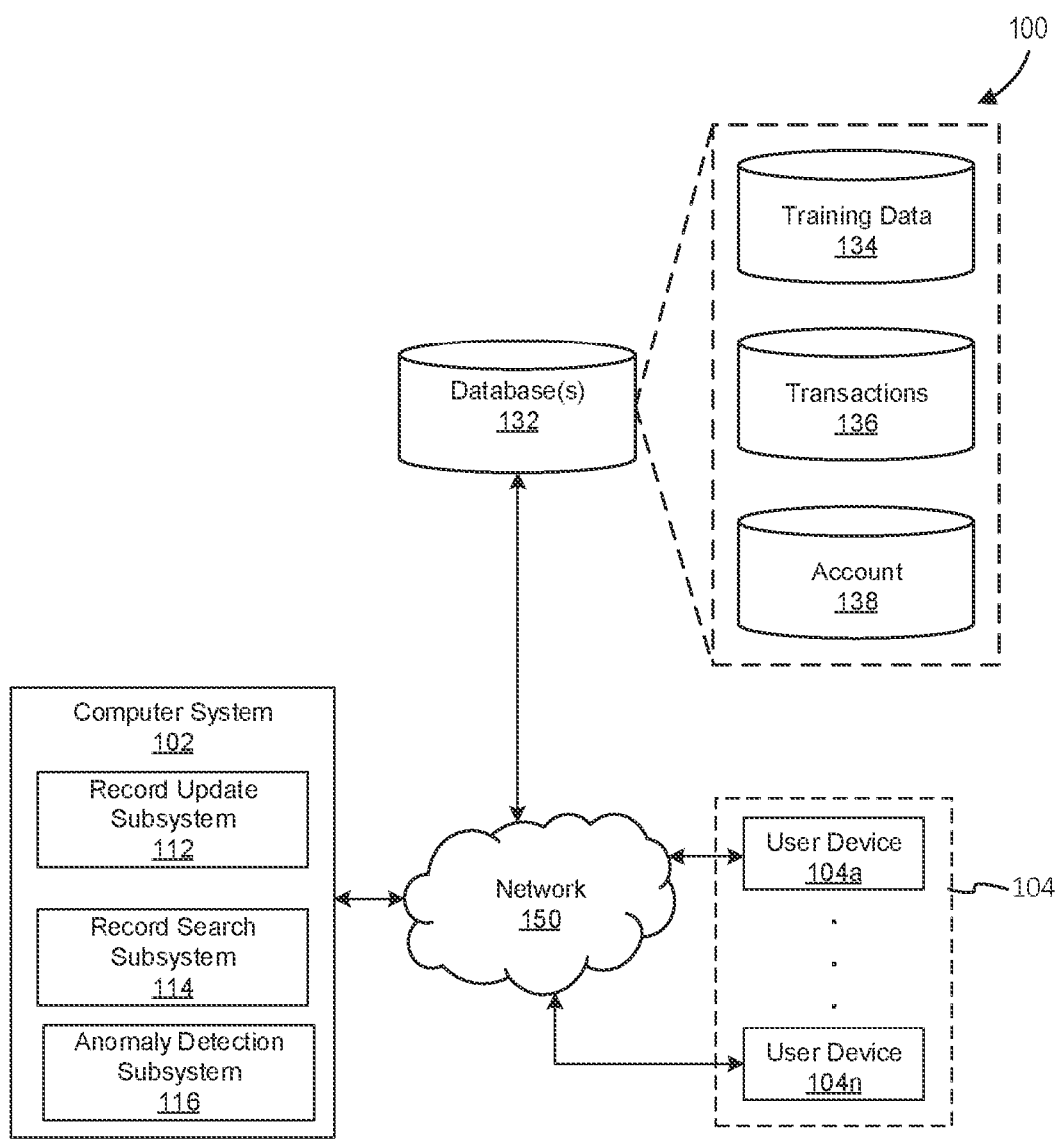
FIG. 1 shows a system for anomaly detection for records based on tracking quantities of database transaction and associations between records, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.
Example Systems FIG. 1 shows a system for anomaly detection for records based on tracking quantities of database transaction and associations between records, in accordance with one or more embodiments. As shown in FIG. 1, system 100 may include computer system 102, a set of user devices 104 including user devices 104a-104n, or other components. Computer system 102 may include a record update subsystem 112, record search subsystem 114, and/or other components. Each user device of the set of user devices 104 may include any type of mobile terminal, fixed terminal, or other device. By way of example, a user device of the set of user devices 104 may include a desktop computer, a notebook computer, a tablet computer, a smartphone, a wearable device, or other user device. Users may, for instance, utilize one or more of the set of user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of the computer system 102, those operations may, in some embodiments, be performed by components of the set of user devices 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

In some embodiments, the system 100 may detect anomalies based on data associated with account records, transaction records, or other records. As used in this disclosure, a transaction record may include a record of a database transaction, where a database transaction may include set of queries to a database. In some embodiments, a transaction record may represent a record of a financial transaction between two accounts. Alternatively, or in addition, a transaction record may also represent other types of transactions, such as a database access event that permitted a user to view and download a digital signature in an account record.

A record may satisfy a set of criteria indicating an anomaly based on values stored in the record and values stored in records associated with the record. For example, the system 100 may detect that a target account record is anomalous based on transactions associated with a set of account records. Various types of anomalies may be detected assigned to a record, such as identifying an account record as a conductor, determining that a set of transaction records show evidence of layering, or the like. The set of records searched for anomaly detection may be based on search parameters (e.g., a path distance threshold), another distance threshold (e.g., a feature space distance threshold), a shared number of categories, etc. For example, the set of records may be selected from a graph of records associated with each other via a set of graph edges, where the graph edges may be encoded as pointers, values in an array, or other data elements. As further discussed below, some embodiments may determine a search parameter using a prediction model, such as a machine learning model or statistical model. For example, some embodiments may select a path distance threshold based on a feed forward neural network.

In some embodiments, the system 100 may perform real-time aggregation of database transaction values associated with a set of account records and store the resulting aggregation records in a real-time aggregation data store. As used in this disclosure, a real-time aggregation data store or another component capable of responding in real-time may provide a response to a query in less than 10 minutes, less than 5 minutes, less than one minute, less than 30 seconds, less than 10 seconds, etc. Some embodiments may use the aggregation value as an input for a decision system to determine whether a set of criteria indicating an anomaly is satisfied. Some embodiments may use reverse indexing operations to determine which records are associated with a transaction and update a set of corresponding records. For example, some embodiments may update a transaction aggregation record associated with a target record after detecting a database transaction and determining the target record by reversing an identifier of the database transaction. Some embodiments may then provide a value(s) of the transaction aggregation record to a decision model to determine whether the target record satisfies a set of criteria. Some embodiments may then send the record to an application program interface (API) of an external server or other third-party computing device.

In some embodiments, a machine learning model may include one or more neural networks. As an example, neural networks may be based on a large collection of neural units (or artificial neurons). Neural networks may loosely mimic the manner in which a biological brain works (e.g., via large clusters of biological neurons connected by axons). A neural unit may receive a set of inputs and produce a set of outputs. Each neural unit of a neural network may be connected with many other neural units of the neural network, where the output of a first neuron may be provided as an input to a second neuron. Such connections can be enforcing or inhibitory in their effect on the activation state of connected neural units. In some embodiments, each individual neural unit may use a summation function or other aggregation function which combines the values of its inputs together. In some embodiments, each connection (or the neural unit itself) may have a threshold function such that the value(s) of an input(s) must surpass the threshold before the value(s) or result of the value(s) are propagated as outputs to other neural units. These neural network systems may be self-learning and trained, rather than explicitly programmed, and can perform significantly better in certain areas of problem solving, as compared to traditional computer programs.

The functions or internal parameters of a neural unit in a neural network or an architecture of the neural network may provide additional features. Some embodiments may use a feed-forward neural network, which may provide features such as faster results. Some embodiments may use a neural network having multiple layers (e.g., where a signal path traverses from front layers to back layers) to increase accuracy. In some embodiments, back-propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. As further described below, some embodiments may use concurrently use different types of machine learning models to perform different tasks. For example, some embodiments may use a shallow (e.g., fewer than 4 layers) feed forward neural network to classify an account record to determine a search parameter for the account record and use a deep recurrent neural network to detect anomalies based on account record values determined based in part on the search parameter.

Subsystems 112-116

In some embodiments, the record update subsystem 112 may update, at least in part, one or more values of a database(s) 132, such as a training database(s) 134, a transactions database(s) 136, an account database(s) 138. The account database(s) 138 may include account records that represent individual users, entities, sets of other accounts, etc. An account record may include indicators of historical account activity, such as a list of account record changes, quantitative score changes, etc. An account record may be indexed using a reverse-indexing scheme, where incoming database transactions may include an identifier of an account that is then partially or fully reversed to obtain an index of an account record in the account database. For example, a database may include the account identifier "12345," which may then be reversed to retrieve an account record having the database index record "54321."

As described elsewhere in this disclosure, some embodiments may store different versions of the account record in different types of databases, where a first database may include advanced attribute indexing and a second database with indexing architecture capable of real-time aggregation. In some embodiments, the second database may stream data to a management system or service, which may permit a user or anomaly detection system to review the data. For example, some embodiments may stream aggregation values stored the second database to a case management system in the form of reports, where a decision system of the case management system may determine whether a report that includes the aggregation values should be sent to a destination API or flagged as an anomaly.

In some embodiments, a transactions database(s) may store a record of database transactions, including operations to read or write data stored in a database of the database(s) 132. Alternatively, or in addition, the transactions database(s) 136 may include a plurality of transaction records for different types of databases. For example, the transactions database(s) 136 may include a first transactions database storing transaction records of transactions for financial transactions, a second transactions database storing transaction records of transactions for security-related transactions, or another transactions database storing transaction records of transactions for other types of transactions.

In some embodiments, an account record may represent an entity account, where an entity account may be linked with multiple account records. For example, a first user account may be represented by a first account record, and a second user account may be represented by a second account record. Both first and second user accounts may be labeled as being part of an entity account, where a third account record may represent the entity account. The entity account may represent a person, a legal entity, an organization, etc. Some embodiments may collect record values from a plurality of accounts indicated as part of or otherwise associated with the entity account and determine whether the collected record values satisfy a set of criteria indicating an anomaly. For example, after determining that five user accounts are associated with a same entity account, some embodiments may obtain a set of update values indicating withdrawals from a set of user accounts. Some embodiments may then sum the set of update values, update a quantitative field of the entity account with the sum, and determine whether the sum satisfies a threshold of a set of criteria indicating an anomaly.

An account record may include identifiers, references, links, or other indicators of other account records. For example, an account record may store pointers to other account records with which the account record has been associated via one or more database transactions. Alternatively, or in addition, some embodiments may store a separate data structures that associate different account records. For example, some embodiments may store a record graph in the form of set of arrays, where at least one array of the set of arrays may represent graph edges of the record graph and another array of the set of arrays may represent weights associated with the graph edges.

In some embodiments, an account record may store other information, such as indicated location at which a financial transaction took place, where the financial transaction may have updated a value of the account record via a database transaction. Other information may also include values such as an account age, an indicator that the account had previously satisfied a set of criteria indicating an anomaly ("set of anomaly criteria"), an indicator that another account associated with the account record has satisfied a set of anomaly criteria, etc. For example, an account record for a target account may indicate that a second account associated with the target account via a database transaction has previously satisfied a set of anomaly criteria. Alternatively, or in addition, an account record may store demographic information, such as a user age or zip code.

In some embodiments, the record update subsystem 112 may include subroutines to generate or update a transaction aggregation record based on transaction records or account records. A transaction aggregation record may be an aggregation record that includes a sum, weighted sum, product, or other value based on a set of database transactions. In some embodiments, an account record may be used as a transaction record. Alternatively, or in addition, a transaction aggregation record may be generated separately from the account record. For example, the record update subsystem 112 may include operations to generate a transaction aggregation record corresponding with a user account record. As described elsewhere in this disclosure, a transaction aggregation record may be stored in a database capable of real-time updating, where the transaction aggregation record may be transferred to a decision system via a stream.

The record search subsystem 114 may be used to obtain categories, scores, or other features for a decision system. The record search subsystem 114 may use a transaction value(s) obtained from a database transaction used by the record update subsystem 112 as an input(s) to determine a search parameter. For example, the record search subsystem 114 may use a machine learning model to categorize an account record as a "type1" or "type2" and, based on the resulting category, determine the maximum path distance by which to search on a graph of user accounts. In some embodiments, the machine learning model may be trained using data provided by the training database(s) 134. The record search subsystem 114 may select a set of nodes of the graph based on the search, where each respective node of the selected set of nodes may map to or otherwise represent a different account record and retrieve one or more values associated with the different account records. As used in this disclosure, a respective node of a set of nodes may be described as mapping to a respective record based on the respective node including an identifier of the record, include a reference to the record, be listed in association to the reference, etc.

Alternatively, or in addition, the record search subsystem 114 may perform various other operations to determine a set of other records based on a target record, where a target record may be an initial record identified by a transaction. Some embodiments may select a set of records that share a category value with the target record or a specified set of category values. For example, some embodiments may select a set of user account records based on a determination that the selected set of records and the target account record share at least one of three features, where a feature of a record may include a value stored in the record, a data field of the record, properties of the record, an identifier of the record, a label of the record, etc.

Alternatively, or in addition, the record search subsystem 114 may perform a clustering operation to determine a set of clusters of vectors generated from the features. A vector may represent a vectorized form of a set of features selected or extracted from an account record or other record. The record search subsystem 114 may then select a set of accounts that are indicated to be within a feature space distance threshold of the target feature, where the feature space distance threshold may be determined using a machine learning model. As described elsewhere in this disclosure, a distance threshold may be used to determine a set of associated records based on a target record. Each respective record of the set of associated records is bounded by the distance threshold in a feature space distance, path distance, or other distance of the target record.

The anomaly detection subsystem 116 may detect one or more anomalies based on values stored in the transactions database(s) 136, account database(s) 138, or another collection of records. The anomaly detection subsystem 116 may include a neural network or other machine learning model (e.g., support vector machine, random forest, or the like) that is trained using the training database(s) 134. After training a machine learning model, some embodiments may use the machine learning model to determine whether a record satisfies a set of anomaly criteria.

As described elsewhere in this disclosure, a record may be categorized into one or more types of anomalies. Some embodiments may categorize "layering" as an anomaly, where a determination may be made that a plurality of database transactions between multiple account records representing financial transactions indicate an attempt to conceal a source of money. For example, some embodiments may determine that a first sum of a first set of transaction values representing withdrawals from a first set of account records is greater than a first sum threshold. In response, some embodiments may label a first record associated with a transaction encoding at least one value of the first set of transaction values as "layering participant."

Some embodiments may categorize "conductor" as an anomaly, where a determination may be made that a plurality of database transactions between multiple account records representing financial transactions indicate an attempt to conduct transactions on behalf of another entity. For example, some embodiments may determine that a second sum of a second set of transaction values representing withdrawals from a second account record is greater than a second sum threshold. and that a third sum of a third set of transaction values representing deposits into the second account record from a third set of associated records is greater than a third sum threshold. In response, some embodiments may label the second record associated with the category value "conductor."

As described elsewhere in this disclosure, the record update subsystem 112, record search subsystem 114, or anomaly detection subsystem 116 may include machine learning models, statistical models, or other decision models to detect and report anomalies. The machine learning models used in this disclosure or their associated model parameters may be stored in model database(s). For example, a set of machine learning models used in this disclosure may include recurrent neural networks, transformer models, point generation neural networks, or other models, and may be retrieved based on which model(s) is selected. Some embodiments may include operations to select different models based on computing resource availability or modify the architecture of a selected model. For example, some embodiments may increase or decrease the number of neural network layers based on an available amount of memory or processor resource.

Figure 2:
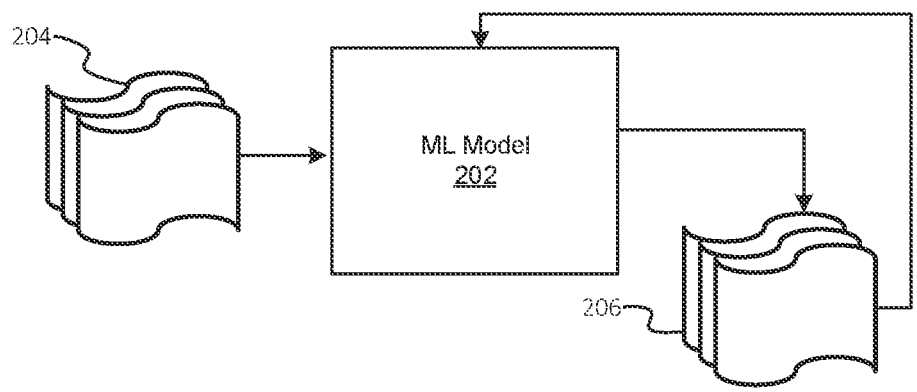
FIG. 2 shows a machine learning model to dynamically modify search parameters, in accordance with one or more embodiments.

FIG. 2 shows a machine learning model to dynamically modify search parameters, in accordance with one or more embodiments. A machine learning model 202 may use inputs 204 to provide outputs 206. In some embodiments, outputs 206 may be fed back to machine learning model 202 as inputs 204 to train machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, the inputs 204 may include multiple data sets such as a training data set and a test data set. For example, in some embodiments, a training data set or a test data set may include a set of records that include a detected anomaly or type of detected anomaly and a corresponding set of values of the record, such as a set of values obtained from a set of transactions identifying the record. Some embodiments may use the training data set to train a machine learning model to determine one or more category values based on a transaction or record associated with the transaction. For example, as shown in FIG. 2, the inputs 204 may include a first transaction value representing the amount withdrawn from an account value of a first account record, a history of previous transactions stored in the first account record, and an account age. The machine learning model 202 may use the inputs 204 to determine the output 206, where the output 206 may include a quantitative score, a category value, or another indicator that may be used to determine a search parameter, as described elsewhere in this disclosure. In some embodiments, the output 206 may then be displayed on a graphic user interface, such as a manager UI capable of flagging or correcting transaction records.

Figure 3:
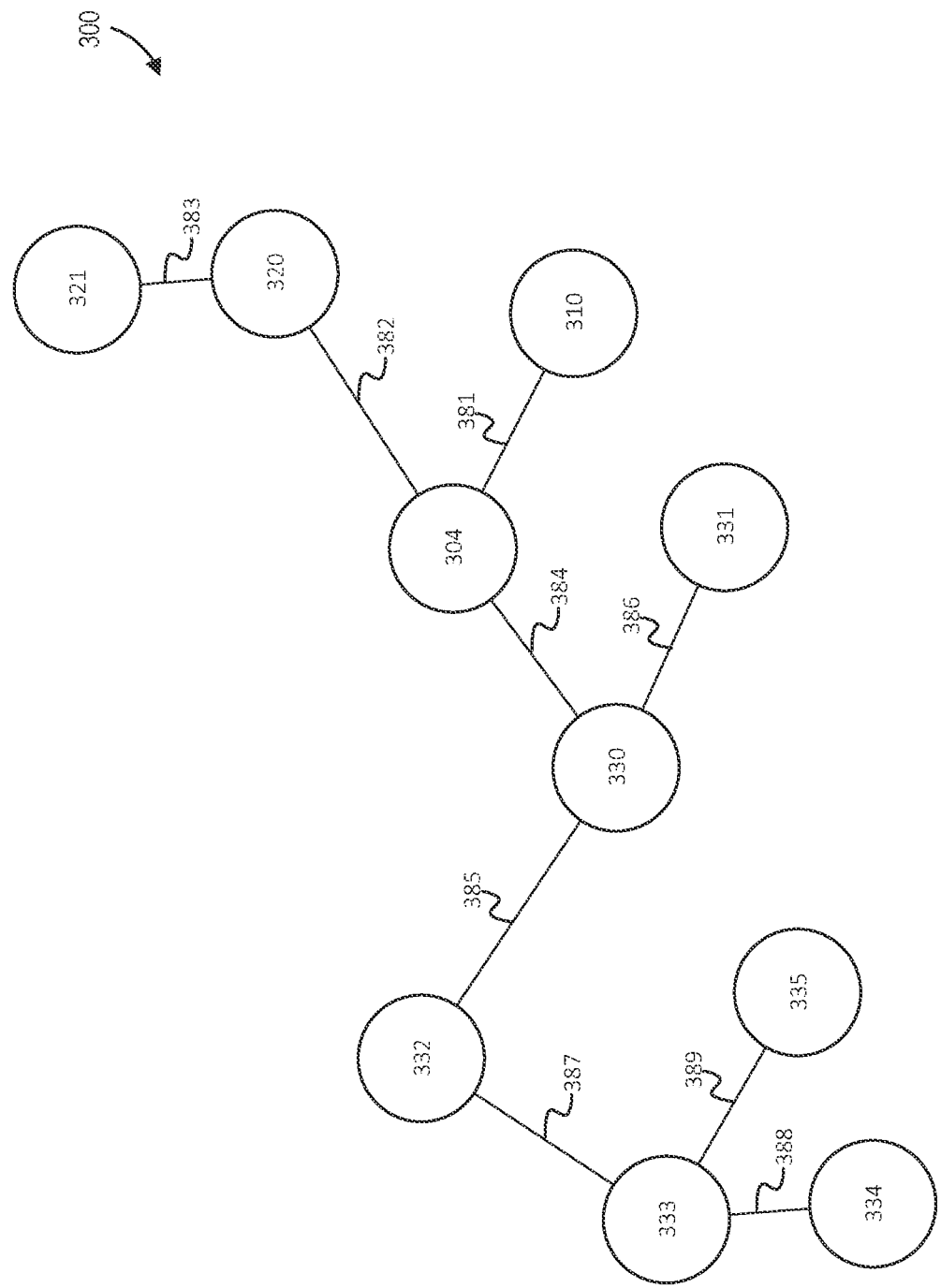
FIG. 3 shows a conceptual diagram of a records graph, in accordance with one or more embodiments.

FIG. 3 shows a conceptual diagram of a records graph, in accordance with one or more embodiments. The graph 300 includes a set of graph nodes and graph edges. Each of the graph nodes 304, 310, 320-321, 330-334, and 340 may map to a record, where the record may include an account record, a record of a transaction, etc. Each of the graph edges 381-389 may connect different graph nodes of the graph 300. A graph edge between two graph nodes may indicate an association between the two graph nodes, where the indication may represent or be generated based on a transaction, indicated association, etc. For example, the graph edge 381 between the graph node 304 and the graph node 310 may represent a set of transactions or other set of updates between the pair of records mapped to by the graph node 310 and the graph node 304, respectively. In some embodiments, a graph edge may represent a set of updates that share an identifier, where the shared identifier may identify one or more records mapped to by at least one of the graph nodes connected by the graph edge. For example, the graph edge 382 may be associated with a three different record updates, where each record update includes an identifier identifying the record mapped to by the graph node 320.

As further discussed below, some embodiments may determine a search parameter for a search through the nodes of the graph 300 after obtaining instructions to perform a search for values associated with the record mapped to by the graph node 304. For example, some embodiments may use a first machine learning model, such as a feedforward neural network, to determine a path distance threshold of "1," which may have been selected from a plurality of path distance thresholds. Some embodiments may then select each of the mapped to by the graph nodes 310, 320, 330, respectively, as a set of selected records having values of interest. For example, some embodiments may determine a total transaction score based on each of the graph nodes 310, 320, and 330. Some embodiments may then provide the total transaction score to a decision model that may include a second machine learning model or other decision model to determine whether the set of transactions involving the records mapped to by the graph nodes 310, 320 and 330 indicate an anomaly.

As further discussed below, a machine learning model may categorize a record with a category value selected from a set of category values, where a respective category value of the category values may map to a different respective search parameter. For example, some embodiments, after obtaining instructions to perform a search for values associated with the record that maps to the graph node 330, may use the first machine learning model to determine a second path distance threshold of "2." Some embodiments may then select each of the records mapped to by the graph nodes 304, 310, 320, and 331-333 as a first set of records, where each record is one or two graph edges away from the graph node 330. Some embodiments may then provide values from each record of the first set of records to determine a graph edge. Some embodiments may perform other operations to determine a search parameter, such as using the machine learning model to assign a risk score to an account record based on a history of activities stored in the account record. Some embodiments may then use a set of thresholds or bins to determine a search parameter based on the risk score. For example, some embodiments may assign a normalized risk score of "0.85" to an account record based on recorded activities, such as creating additional accounts associated with a same user identifier, closing accounts associated with a same user identifier, opening up different types of accounts, being associated with another account that was indicated as anomalous, etc.

Figure 4:
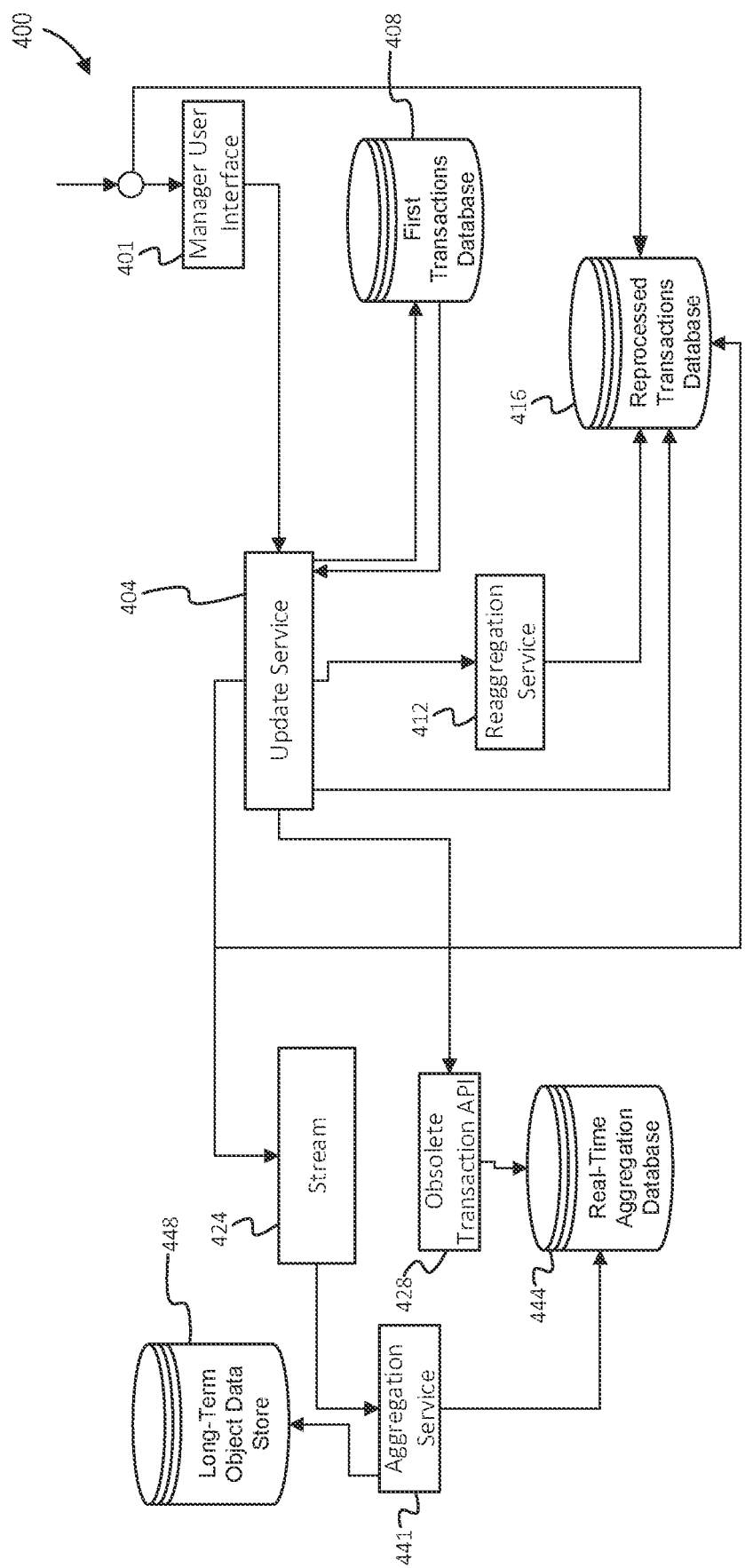
FIG. 4 shows a first architecture of a system used to store records in a real-time aggregation database, in accordance with one or more embodiments.

FIG. 4 shows a first architecture of a system used to store records in a real-time aggregation database, in accordance with one or more embodiments. The architecture 400 shows a set of components, services, or data stores usable for performing one or more operations described in this disclosure. In some embodiments, update messages may be received by a manager UI 401. As used in this disclosure, an update message may include a transaction request, another type of command that causes a database transaction, a message indicating that a transaction request has been sent, an acknowledgment indicating that a transaction has been completed, etc. For example, some embodiments may obtain an update message comprising a set of update values (e.g., transaction values) provided by a listener process that reports changes to a database, where the listener process may be implemented as a database listener, event listener, event handler, etc. In some embodiments, the listener process may provide a version of an update command that causes one or more of the operations described in this disclosure. Alternatively, or in addition, the listener may provide an update message that includes values of an update and a database identifier but does not cause further changes in a database identified by the update message.

In some embodiments, a manager UI 401 may provide a set of UI elements that enable a user of the manager UI 401 to send a version of the update message to an update service 404. For example, a user of the manager UI 401 may click on a button labeled "get next" or another UI element of the manager UI 401 and retrieve a record associated with a database transaction for review. For example, some embodiments may retrieve and display a currency transaction report (CTR) that includes information related to a database transaction for review. As described elsewhere in this disclosure, one or more operations may be performed to generate or update an indicator that a transaction or set of transactions is anomalous. In addition, some embodiments may receive an acknowledgment from an external entity indicating that a previously-sent aggregation value include one or more issues requiring correction and display one or more report values indicated by the acknowledgment on the manager UI 401 in real-time as the acknowledgment is received and stored in an acknowledgment records database. The user of the manager UI 401 may interact with the manager UI 401 to manually update transaction data or another type of update message, where the update message may then be sent to an API of the update service 404.

The update service 404 may perform various operations, such as storing a set of values associated with the update message in a first transactions database 408. In some embodiments, the first transactions database 408 may be used to store transaction records or other update records, where operations to determine a hierarchy or associated entities of a transaction may be performed after storing transaction data is stored in the first transactions database 408. In some embodiments, update service 404 may perform operations to complete a transaction, where one or more operations may be performed to determine whether a previous transaction should be rendered obsolete at a reaggregation service 412.

In some embodiments, the reaggregation service 412 may perform operations to determine whether a new transaction record should be generated or if an existing transaction record should be updated. In response to a determination that a new transaction record should be generated, some embodiments may store the new transaction record in the reprocessed transactions database 416 as an initial record and indicate the transaction has not been re-processed. In response to a determination that an existing transaction record should be updated, the reaggregation service 412 may update the existing transaction record in the reprocessed transactions database 416. Furthermore, some embodiments may perform operations to update a transaction record stored in the reprocessed transactions database 416 in response to receiving instructions to update a transaction record for a previously-completed transaction. Furthermore, some embodiments may permit a user to directly update a record of the reprocessed transactions database 416, such as permitting a user to use the manager UI 401 to update values stored in a record of the reprocessed transactions database 416.

In some embodiments, a record may be categorized as obsolete. For example, some embodiments may receive instructions that a previously-completed database transaction included an incorrect transaction value. In response, some embodiments may perform operations to render the corresponding record of the transaction obsolete, such as by storing an indicator indicating that the previously-completed database transaction is obsolete in a record of the previously-completed database transaction in the reprocessed transactions database 416. Additionally, some embodiments may perform a set of time-based job scheduler operations to re-send failed transactions stored in the reprocessed transactions database 416 to the update service 404 for review. Some embodiments may further determine that a related database transaction may be in the processing state. In response, some embodiments may send a message indicating that the related database transaction is obsolete or is otherwise anomalous to an obsolete transaction API 428.

In some embodiments, the update service 404 may provide an update message, such as a query, another type of database transaction request, or message that includes values of a database transaction to an aggregation and consolidation microservice 441 via a stream 424, where the stream 424 may include a messaging stream such as a Kafka messaging stream. Some embodiments may send multiple versions of an update message to an API designed to process the update message into the stream 424 in the event of one or more failures. Some embodiments may then perform operations to reprocess a transaction in the event of the failures. For example, the update service 404 may send a message via the stream API indicating that a related transaction is obsolete. However, due to the asynchronous nature of database transactions in certain systems, the related transaction may be locked or otherwise unavailable. Some embodiments may re-attempt sending the update message via the stream 424 up to a threshold number of times, such up to three times, up to five times or up to some other number of times greater than one in response to a failure to receive an acknowledgment that a transaction was successful.

As described above, the update service 404 may provide the update message to the aggregation and consolidation microservice 441. The aggregation and consolidation microservice 441 may collect data from multiple transactions when determining a set of aggregation values. Some embodiments may store the set of aggregation values in the form of a transaction aggregation record. Some embodiments may further generate a document based on the set of aggregation values for display on a user interface or to be provided in a form readable by a word processing computer program. For example, some embodiments may generate a CTR document for internal or external consumption based on the set of aggregation values. Some embodiments may store a transaction aggregation record or a document based on the transaction aggregation record in a long-term object data store 448. Alternatively, or in addition, the aggregation and consolidation microservice 441 may send values to store in the real-time aggregation database 444, which, as further described below, may include a distributed cache. The real-time aggregation database 444 may be implemented in various forms, such as an Amazon AWS DynamoDB database, Google Datastore database, Google Bigtable database, Microsoft Azure Cosmos DB, etc. Some embodiments may reverse a transaction identifier or other transaction value to determine a reversed index key ("reversed key"), where the reversed key is then used to index an aggregation record when the aggregation record is stored into the real-time aggregation database 444 or the long-term object data store 448.

In some embodiments, the update service 404 may send a message indicating the obsolescence of a transaction to an obsolete transaction API 428. Once the message is received by the obsolete transaction API 428, a related service may indicate that a set of transaction values provided by or generated from the data provided by the transaction. A report, summarization, or other set of values may then be provided to the real-time aggregation database 444, where the real-time aggregation database 444 may be a distributed database, such as an Amazon AWS Dynamo DB. By storing a set of transaction aggregation records in the real-time aggregation database 444, some embodiments may increase the speed by which aggregation values may be retrieved based on a transaction. As described further below, such gains may be useful when a system is expected to provide sub-second results while handling a plurality of database transaction requests.

Figure 5:
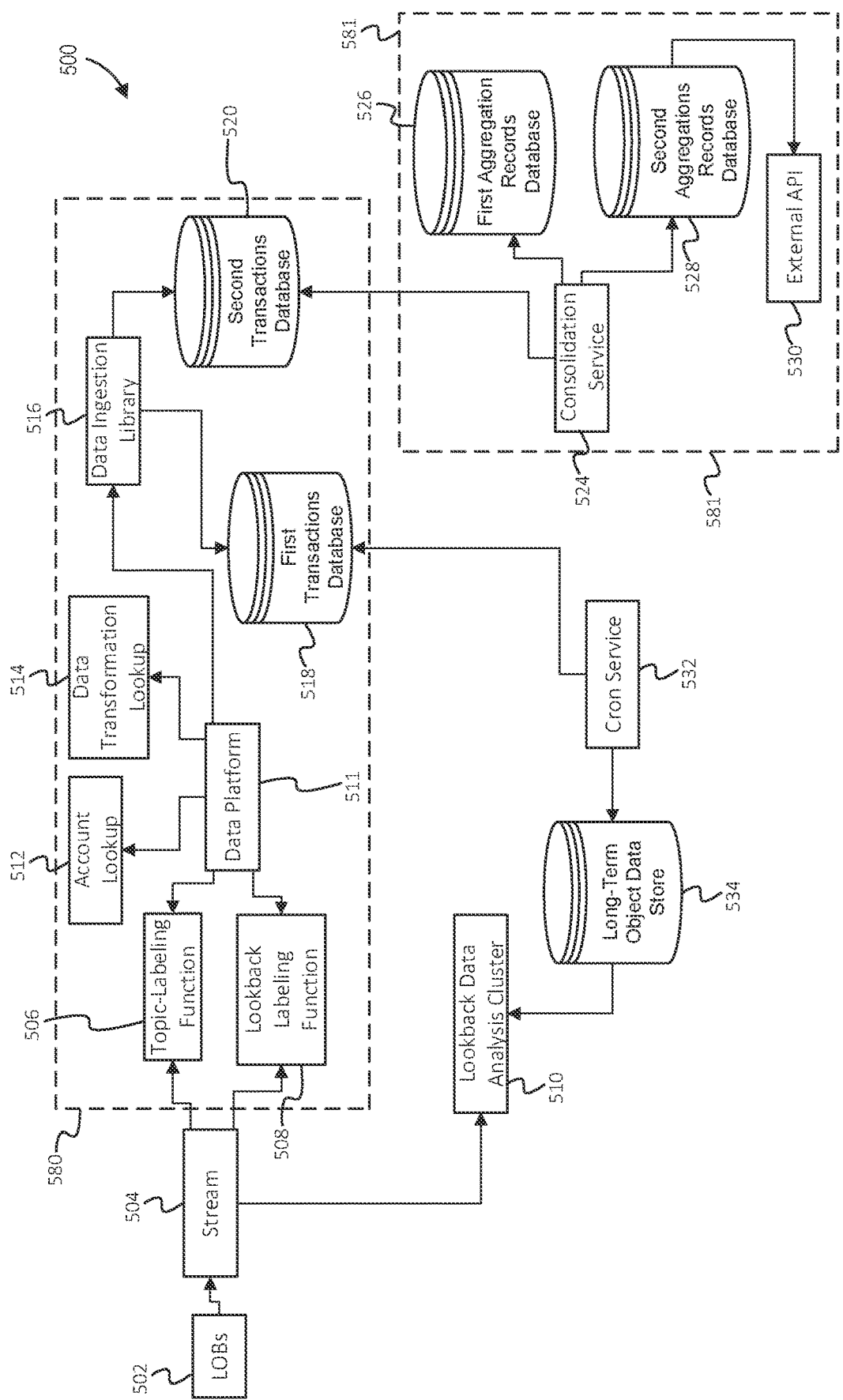
FIG. 5 shows a second architecture of a system used to aggregate and consolidate records, in accordance with one or more embodiments.

FIG. 5 shows a second architecture of a system used to aggregate and consolidate records, in accordance with one or more embodiments. The architecture 500 shows a set of components, services, or data stores usable for performing one or more operations described in this disclosure. Some of the components and services of the architecture 500 are divided into an aggregation microservice 580 and a consolidation microservice 581. In some embodiments, the aggregation microservice 580 and the consolidation microservice 581 may be similar to or perform functions similar to those performed by the aggregation and consolidation microservice 441.

Some embodiments may receive a transaction request from a line of business (LOB) program 502. The LOB program 502 may transmit data to the aggregation microservice 580 in the form of stream 504, which may be similar to the stream 424. In some embodiments, records or other data of the stream 504 may be sent to a lookback data analysis cluster 510. The lookback data analysis cluster 510 may be part of or otherwise be accessible to the long-term object data store 534, which may be similar to or perform operations similar to operations performed by the long-term object data store 448. In some embodiments, a cron service 532 may provide job scheduling service to update the long-term object data store 534 with records or other data stored in a first transactions database 518, which is described further below.

An instance of the aggregation microservice 580 may receive update messages provided in the stream 504. A microservice instance may be an instance of a microservice that includes a set of APIs that expose the microservice other microservices or other applications and performs a one or more particular functions intended to be combined with other functions. For example, a microservice instance may receive instructions to update an aggregation database based on an identifier of a transaction aggregation record. and, in response, implement the update to the transaction aggregation record. Some embodiments may scale a microservice to account for increased or decreased use of the microservice, such as by increasing the number of microservice instances in operation.

Some embodiments may assign one or more category values to a transaction or plurality of transactions encoded in the stream 504 using a topic-labeling function 506 of the aggregation microservice 580. For example, some embodiments may label a transaction with one or more CTR topics based on a transaction request encoded in the stream 504. For example, some embodiments may assign the topic "topic1" to a transaction record based on a determination that transaction value is greater than a score threshold and has a transaction type "cash." Some embodiments may also use a lookback labeling function 508 of the aggregation microservice 580, where the lookback labeling function 508 may be used to assign one or more topic labels to a transaction based on historical transaction information. For example, some embodiments may assign a set of CTR lookback topics to a set of transaction records based on their corresponding transaction identifiers and other records associated with those transaction identifiers.

In some embodiments, the topic-labeling function 506 or lookback labeling function 508 may be a part of or otherwise use outputs provided by a data platform 511 of the aggregation microservice 580. The data platform 511 may include various tools to provide operations such as data aggregation, data cleaning, data feature engineering, data analysis, etc. For example, the data platform 511 may perform data analysis on transactions using machine learning models, and may include an Amazon EMR cluster, Google Cloud Dataproc, Microsoft Azure HDInsight, etc.

Other operations of the data platform 511 may include selecting a corresponding account record for a transaction record with an account lookup function 512 of the aggregation microservice 580. For example, as described elsewhere in this disclosure, some embodiments may obtain an identifier of a transaction request or another update message and, in response, determine an index value based on the transaction identifier. As described elsewhere in this disclosure, some embodiments may reverse a sequence of the identifier to obtain a reversed key. The reversed key may be used to select a set of account records using the account lookup function 512. Alternatively, or in addition, operations of the data platform 511 may include determining an appropriate format to use as input or provide in an output data transformation lookup function 514 of the aggregation microservice 580. For example, some embodiments may use an identifier of a transaction to determine a data format for output using a reverse key determined by reversing the identifier.

As described elsewhere in this disclosure, some embodiments may perform operations to dynamically modify a search parameter used to determine the number of related records to search when obtaining information about a record. In some embodiments, the data platform 511 may perform one or more operations described in this disclosure to determine a search parameter using a first machine learning model. In addition, some embodiments may use one or more components or services of the data platform 511 or accessible to the data platform 511 to determine whether a set of values of a transaction record, set of values of an account record or another set of values satisfies a set of criteria indicating an anomaly, where one or more identifiers may be reversed before being used to retrieve a related record. For example, a data platform 511 may update a record with a category value "TRIGGERED" after determining that a set of values obtained from a set of accounts satisfy a criterion that a sum of a set of values representing score changes of the set of accounts is greater than or equal to 10,000. Furthermore, a decision system operating on the data platform 511 may update an account record with a category value "conductor" based on a set of aggregation values indicating that an account record is acting as a conductor of business on behalf of another entity. For example, the decision system may determine that a first account record has been regularly transferring an amount to or from a second account record that has been indicated as anomalous. In response, the decisions system may categorize the first account record with the category value "conductor," which may be a subset of an indication of an anomaly.

In some embodiments, the data platform 511 may obtain a structured update message indicating that a set of criteria of the update message does not satisfy a set of criteria. Some embodiments may then analyze different segments of the structured message to determine whether one or more specific data field of the structured message is missing or erroneous. In response to a determination that a specified data field is missing or erroneous, some embodiments may then send a warning message to a user account that identifies or otherwise provides an indicator of the data field.

An instance of the aggregation microservice 580 includes a data ingestion library 516 that may be a part of or otherwise used by the data platform 511. The data ingestion library 516 may be used to ingest different types of data provided by a component of the data platform 511. For example, the data ingestion library 516 may be used to obtain a set of update messages that are enriched with data from an account record associated with a transaction for storage in a first transactions database 518 and a second transactions database 520, where the aggregation microservice 580 may include or otherwise access the first transactions database 518 and the second transactions database 520.

In some embodiments, the first transactions database 518 may be used to store transaction records or other update messages in an unmodified form with respect to an initial transaction request or a subsequent output of a transaction. For example, the first transactions database 518 may store a transaction identifier of a transaction request, a corresponding set of affected account records that are updated by the transaction request, and an amount changed by the transaction request, etc. In some embodiments, the first transactions database 518 may be similar to or perform operations similar to those performed by the first transactions database 408. In addition, some embodiments may use a time-based job scheduler service such as the cron service 532 to archive data from the first transactions database 518 into the long-term object data store 534.

In some embodiments, the second transactions database 520 may receive a different set of records from those received by the first transactions database 518. For example, the data ingestion library 516 may process outputs provided by processes or services operating on the data platform 511 organized by entities or account records. In some embodiments, a transaction record stored in the second transactions database 520 may include features indicating associations with other records, account records, etc. Furthermore, the time in which these processed records are stored in the second transactions database 520 may be temporary. For example, some embodiments may delete a record that has been stored in the second transactions database 520 after a determination that a duration threshold corresponding to the record has been satisfied, where the duration threshold may be less than one hour, less one day, less than 30 days, less than one year, less than ten years, less than 50 years, etc.

The aggregation microservice 580 may use a database stream, such as a DynamoDB stream, that streams events upon an update from a consolidation service function 524 of the consolidation microservice 581 to the second transactions database 520. The consolidation service function 524 may be used to generate records for storage in a set of records of a first aggregation records database 526 or the second aggregation records database 528, where the consolidation microservice 581 may include or access the aggregation records database 526 or the second aggregation records database 528. In some embodiments, the first aggregation records database 526 or second aggregation records database 528 may be similar to or perform operations similar to operations performed by the real-time aggregation database 444. For example, some embodiments may reverse an identifier of a first transaction record to determine a reversed key and store an aggregation record indexed by the reversed key in the first aggregation records database 526. Some embodiments may then reverse the identifier of a second transaction record to reconstruct the reversed key, search for the first aggregation record using the reversed key, and update the first aggregation record based on one or more values of the second transaction record.

Some embodiments may provide a set of aggregation values for an account or entity identified by an account stored in the second aggregation records database 528 to an external API 530, which may be an API of an external server. For example, a record of the second aggregation records database 528 may include a CTR document containing one or more aggregation values. Some embodiments may retrieve the CTR document from the aggregation record and send the CTR document to a government server via the external API 530.

Figure 6:
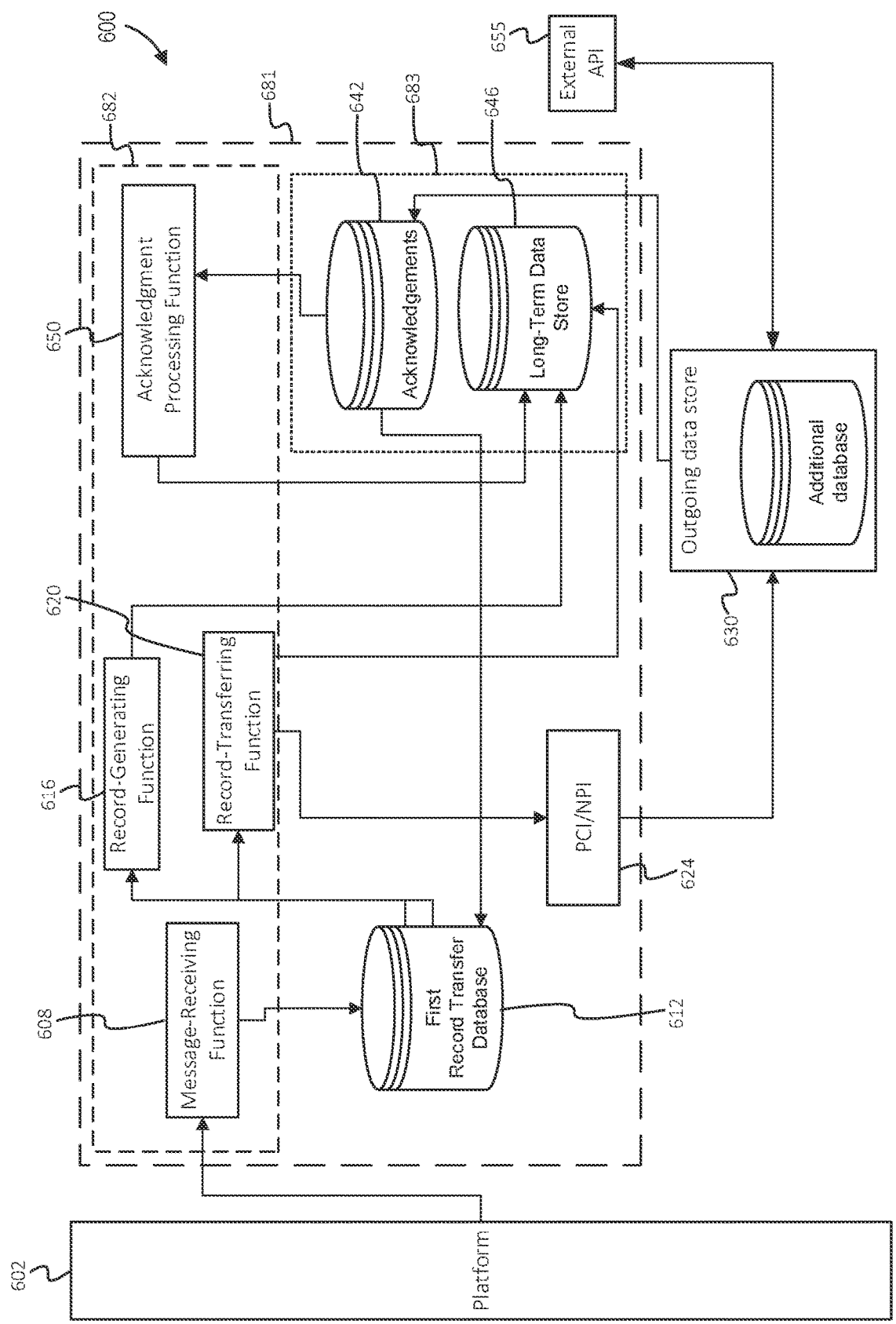
FIG. 6 shows a third architecture of a system containing a microservice, in accordance with one or more embodiments.

FIG. 6 shows a third architecture of a system containing a microservice, in accordance with one or more embodiments. The third architecture 600 includes a data packaging microservice 681, which includes a set of data packaging APIs 682 and a set of data stores 683. The set of data packaging APIs 682 may include a message-receiving function 608, a record-generating function 616, a record-transferring function 620, and an acknowledgment processing function 650.

The set of data stores 683 of the data packaging microservice 681 may include an acknowledgments data store 642 and a long-term data store 646. Some embodiments may store one or more acknowledgments indicating that a message sent to an internal or external microservice or API was received in the acknowledgments data store 642. For example, some embodiments may store acknowledgment records indicating that a CTR document was rejected. Some may then provide records from the acknowledgments data store 642 to acknowledgment processing function 650 to update a corresponding record in the long-term data store 646. In some embodiments, the acknowledgment processing function 650 may provide a record associated with a rejected CTR document for review by a user via a UI element in response to receiving the acknowledgment indicating that the CTR document has been rejected.

Some embodiments may receive update messages from a platform 602 at a message-receiving function 608 of the set of data packaging APIs 682. The message-receiving function 608 may send a version of the update message to the first record transfer database 612. In some embodiments, records or record values from the first record transfer database 612 may be provided, as inputs, to a record-generating function 616 or a record-transferring function 620. The record-generating function 616 may be used to generate a record that may then be stored in the long-term data store 646, where the record may include a CTR document. Alternatively, or in addition, the record-generating function 616 may be used to store or update a corresponding record in the first record transfer database 612.

In some embodiments, the record-transferring function 620. Some embodiments may secure (e.g., via encryption) or remove non-public personal information (NPI) or payment card industry (PCI) information from a set of transaction records or account records using a PCI/NPI function 624 of the data packaging microservice 681. In some embodiments, the record-transferring function 620 may provide a record as an input to the PCI/NPI function 624 to remove protected information, where the record may then be provided to an outgoing data store 630. In some embodiments, records of the outgoing data store 630 may then be sent to an external API 655. In some embodiments, the external API 655 may be similar to or perform operations similar to operations performed by the external API 530.

Example Flowcharts

Figure 7:
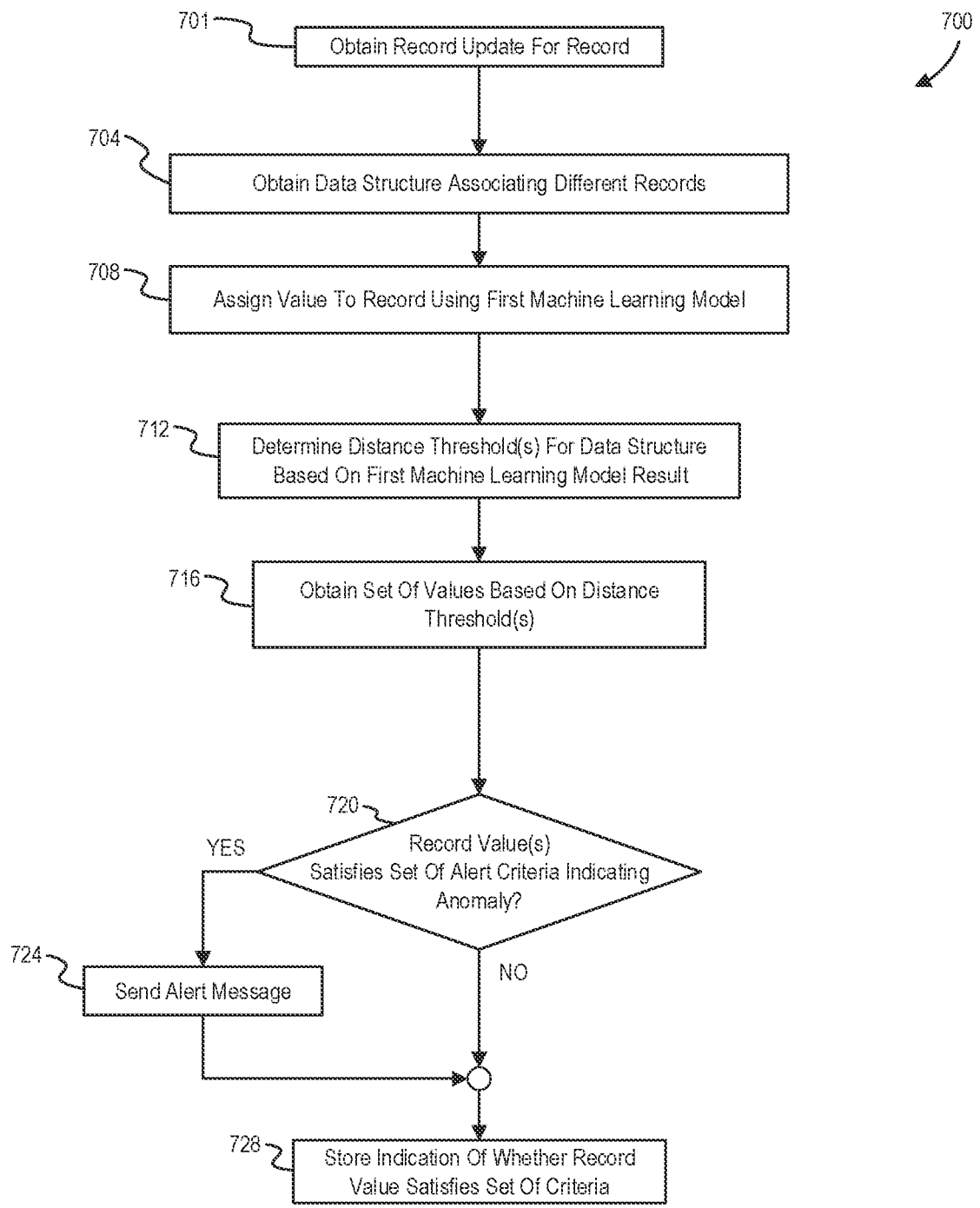
FIG. 7 shows a flowchart of operations to determine a search parameter and whether a set of criteria are satisfied based on the search parameter, in accordance with one or more embodiments.
Figure 8:
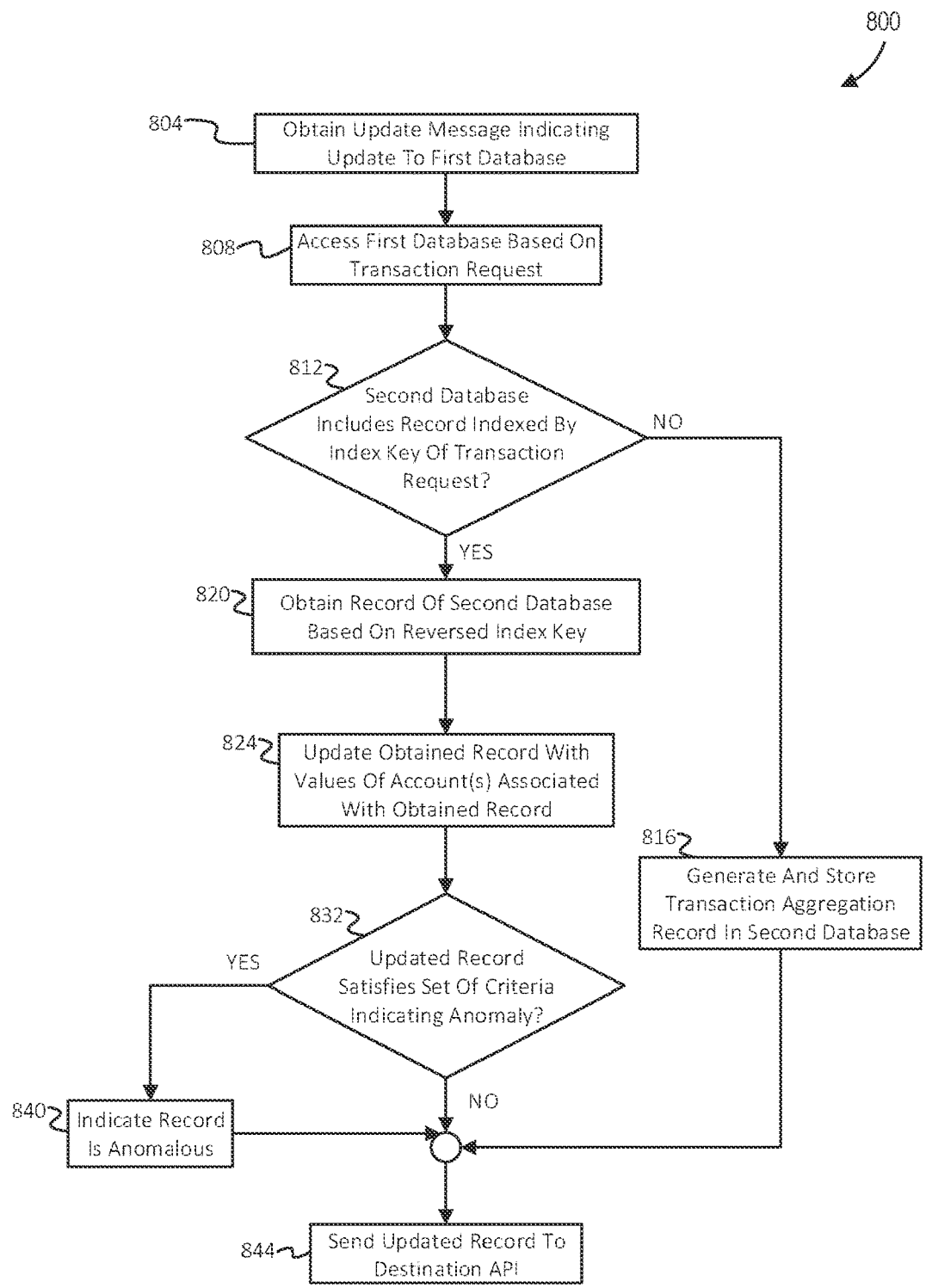
FIG. 8 shows a flowchart of operations to update a record and send values of the updated record to a destination application program interface, in accordance with one or more embodiments.

FIGS. 7-8 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 7 shows a flowchart of operations to determine a search parameter and whether a set of criteria are satisfied based on the search parameter, in accordance with one or more embodiments. Operations of the process 700 may begin at operation 701. In an operation 701, a record update for a record may be obtained. Some embodiments may detect a record update that is caused by a database transaction identifying one or more account records. For example, some embodiments may detect a database transaction causing a score change to a quantitative score stored in a user account record.

The record update may include a set of identifiers, where the identifiers may identify a database transaction(s) or a set of records. For example, some embodiments may obtain a record update in the form of instructions that identify a plurality of account records, such as a first account record and another account record, where the record update may cause a score increase for a score of the first account record and a score decrease for a score of the other account record. Additionally, the database transaction may indicate a corresponding score change in a second user account record. For example, a record update may be a score-changing record update that causes one or more scores stored in or otherwise associated with a record change to a different value. A score-changing record update may update the score in various ways, such as by addition, multiplication, etc. For example, after obtaining a score-changing record update, some embodiments may add a value encoded in the score-changing record update to a score stored in an account record. As described in process 800 below, some embodiments may perform a reverse indexing operation to retrieve the set of account records.

In an operation 704, a data structure associating different records may be obtained. The data structure may indicate associations between different records and may be stored in various forms, such as a linear data structure, tree data structure, hash data structure, or graph data structure. Some embodiments may search through a data structure based on an initial record and a set of search parameters. Various search parameters may be used and may depend on the data structure used to associated different records.

In some embodiments, the data structure associating different records may be a graph data structure. As described elsewhere in this disclosure, the graph data structure may be stored in the form of a set of arrays, where a first array may represent a set of graph edges indicating the graph edges connecting different graph nodes, and where each respective graph node of the different graph nodes mapped to by a respective record. Some embodiments may search through a graph data structure based on a search parameter such as a path distance threshold. In some embodiments, the search through the graph may start at a first graph node representing the initial record and proceed through paths that start from the first graph node to other graph nodes.

As described elsewhere in this disclosure, a graph edge may be associated with a set of updates. The graph edge may include or be associated with values based on the set of updates, such as a sum of values determined based on a set of database transactions causing a transfer of a score value of a first record to a second record. The associated values may be stored as weight values associated with the graph edges. For example, a graph edge that is directed from a first graph node to a second graph node may be assigned a weight value of "50," which may indicate that the record mapped to by the first graph node has a score change of "−50" while the record mapped to by the second graph node has a complementary score change of "+50." Some embodiments may associate a plurality of weight values to a graph edge, where each weight value may indicate a different feature. Alternatively, or in addition, some embodiments may include a plurality of graph edges between a pair of graph nodes. For example, a first graph edge may be directed from a first graph node to a second graph node, the second graph edge may be directed from the first graph node to the second graph node, and a third graph edge may be directed from the second graph node to the first graph node. Each respective graph edge of the three graph edges may be associated with a corresponding way to value. As discussed elsewhere in this disclosure, some embodiments may apply one or more thresholds to filter graph edges based on their corresponding weight values when searching for associated records.

In some embodiments, the data structure associating different records may be the same data structure storing the different records. For example, if a set of records are stored in a relational database, such as a SQL table, some embodiments may use the same type of relational database as the data structure associating the set of records. In some embodiments, a feature stored as a column of the SQL table may include an index value or other identifier of associated records in the SQL table. For example, a first column of a first record in the SQL table may include an array of identifiers, each respective identifier corresponding with another record of the SQL table. Some embodiments may then traverse the SQL table directly based on the values of the first column to identify a set of records. Alternatively, some embodiments may use a different data structure type to associate records that are stored in a second type of data structure. For example, some embodiments may store a set of transaction aggregation records in a key-value database, where the values of a key-value database are not required to share the same number of features or the same data type. Some embodiments may use a key-value data store to store transaction aggregation types to improve adaptability and add additional features or data in association with a transaction aggregation record.

In an operation 708, a value may be assigned to the record using a first machine learning model. Some embodiments may assign a category value to a record based on an update history or other values stored in the record. For example, some embodiments may use a feed-forward neural network that determines a neural network result using, as inputs, the times the record was updated, a time difference since a previous update to the record, or the amounts by which a score stored in the record was updated. Alternatively, or in addition, some embodiments may assign a quantitative value to the record based on the update history or other values. For example, some embodiments may assign a risk score of "0.5" to an account record based the values of the account record.

Some embodiments may include other inputs for the machine learning network, such as categories associated with the database transaction, where the categories may indicate various phenomena or features of a transaction, such as the type of computing device used to initiate a transaction or an institution-mandated category for a transaction. For example, the category value may be associated with a transaction type, such as "credit" or "debit." For example, a machine learning model may be provided the list [["61", "90", "ATM", "credit"],["62", "100", "ATM", "credit"],["57", "−1000", "ATM", "debit"]] as an input and output a category value "type2" an neural network result.

Some embodiments may normalize a set of inputs before providing the normalized results to the first machine learning model as inputs. Alternatively, or in addition, some embodiments may determine a measure of central tendency based on an initial set of inputs before providing the measure(s) of central tendency to a machine learning model. For example, some embodiments may collect a history of updates, determine a mean average score change of the previous five updates, and provide the mean average score change as an input to a machine learning model.

Some embodiments may select different machine learning models based on the type of data available for the machine learning model. Some embodiments may also select different machine learning models or parameters of the machine learning models based on computing constraints or time constraints. For example, some embodiments may include a limitation that results of the first machine learning model be provided within 100 milliseconds (or another time threshold) and, in response, some embodiments may select a first neural network model having two neural network layers. In some embodiments, the first neural network model may have been selected from machine learning models that included neural network models having different layers or other machine learning models such as other types of neural network models, support vector machines, random forest, nearest neighbor, Naïve Bayes, etc. For example, some embodiments may obtain instructions to perform an extended search parameter determination operation and, in response, select a recurrent neural network model from a plurality of neural network models in order to determine a neural network result that is then used to determine a category value for a record.

Alternatively, or in addition, some embodiments may use a rule-based system. A rule-based system may determine a category value for a record based on one or more criteria. Some embodiments may use a rule-based system in conjunction with a first machine learning model to assign a category value to a record. For example, some embodiments may first determine whether a first record should be labeled with a category value "type1." The determination may be based on whether a first graph node mapping to the first record is adjacent to a second graph node mapping to a second record that is already labeled with the category value "type1" via a graph edge having a weight value that is greater than a weight value threshold. As used in this disclosure, a first record may be described as adjacent to a second record if a first graph node and a second graph node mapping to the first record and second record, respectively, are adjacent nodes. A first graph node is adjacent with a second graph node if a graph edge connects the first graph node with the second graph node.

In an operation 712, a set of distance thresholds for the data structure associating different records may be determined based on a result of the first machine learning model. In some embodiments, each category value of the set of categories that may be assigned to a record may correspond with a distance threshold. For example, the category value "Type1" may correspond with the distance threshold "1," and the category value "Type2" may correspond with the distance threshold "2," where each distance threshold may be one of a plurality of distance thresholds.

The application of the distance threshold may be based on the type of data structure that is being searched. For example, a first distance threshold may be a path distance threshold for a graph data structure that indicates the maximum number of graph edges that a search path starting from an initial graph node may have. For example, some embodiments may determine that a first account record is assigned a category value of "type1," which corresponds with the path distance threshold "1," and determine that a second account record is assigned a category value of "type," which corresponds with the path distance threshold "3." In some embodiments, the path distance threshold may be mapped to by a plurality of types. For example, some embodiments may select a path distance threshold of a plurality of path distance thresholds, where records labeled as "typeA" may be associated with the path distance threshold "1" and records labeled as "typeB" and "typeC" may be associated with the path distance threshold "3." Some embodiments may determine a distance threshold based on a quantitative score provided by the first machine learning model. For example, after determining a risk score "0.25" for a user account record, some embodiments may apply a binning operation or other operation to map the risk score to a path distance threshold.

Some embodiments may instead search within the boundary of a feature space of a record. For example, some embodiments may obtain instructions to search for records within a feature space distance of a target record, where the range of the feature space may be bounded by a feature space distance threshold. As further described below, some embodiments may assign a first category value to the target record based on a determination that a threshold number of records are already labeled with the first category value or some other category value.

In an operation 716, a set of values may be obtained based on the distance threshold. Some embodiments may traverse through a records graph via a set of paths to select a set of nodes that are within a range of a target record. As described elsewhere in this disclosure, traversing through the records graph may include determining a respective path from a first graph node mapping to the first record to other graph nodes, where the respective path distance of the respective path is less than or equal to the distance threshold, and where the respective path distance may be measured by the number of graph edges that must be visited to traverse the path. For example, some embodiments may perform a search starting from a first graph node representing a first record and increment a counter by "1" for each graph edge taken by the first graph node when traversing through a path through a records graph. Some embodiments may continue traversing through the path while the counter is less than or equal to the path distance threshold, and stop updating the path or traversing through the path when the counter is equal to the path distance threshold. Alternatively, some embodiments may stop generating the path before the counter is equal to the path distance threshold.

By traversing through the set of paths, some embodiments may generate a subgraph that includes the graph nodes or graph edges visited by at least one path of the set of paths. Some embodiments may then select the graph nodes of the subgraph as a set of graph nodes associated with the first node. Some embodiments may then determine a set of values associated with the set of nodes or the first node, such as quantities associated with database transactions, frequencies of the transactions, cyclical quantities between the set of nodes, etc. As described elsewhere in this disclosure, the set of values may be used as a set of inputs to a decision model to determine whether the set of values satisfy a set of criteria that indicate an anomaly. By modifying the search parameter based on values of a record mapped to by the graph node, some embodiments may dynamically scale the number of inputs provided to the decision model.

In some embodiments, each respective value of the set of values or a subset of values of the set of values may be associated with a different record update. For example, each respective value of the set of values may be associated with a respective database transaction or other respective record update associated with a respective timestamp, where the respective record updates may be different from each other. In some embodiments, the record updates may be filtered based on a time threshold, where each respective record update corresponding with a respective value of the set of values may have occurred after the time threshold. For example, a first set of values may include a second set of values and a third set of values, where the second and third set of values do not share any values. The second set of values may each be obtained based on the second set of records after the occurrence of a first record update, which is indicated by a corresponding first update timestamp to have occurred after a time threshold. Similarly, the third set of values may each be obtained based on a third set of records after the occurrence of a second record update, where the second record update occurred after the first record update. Additionally, some embodiments may filter out a fourth set of record values based on the fourth set of record values being collected before the time threshold.

In an operation 720, a determination may be made of whether the set of record values satisfy a set of alert criteria indicating an anomaly. Some embodiments may determine whether the set of record values satisfy the set of alert criteria indicating an anomaly based on a decision model. The decision model may include a second machine learning model or another type of decision model. In some embodiments, different criteria or subsets of criteria may correspond with different indicators of anomalies. For example, some embodiments may label a transaction record with a first anomaly label if a first subset of the set of criteria is satisfied and label the transaction with a second anomaly label if a second subset of the set of criteria is satisfied.

As described above, some embodiments may use a second machine learning model to determine whether the set of record values satisfy the set of criteria, where the set of criteria may include a criterion that an output of the second machine learning model is greater than a criterion threshold. Various machine learning models may be used and may include a neural network to determine whether a set of alert criteria is satisfied. For example, some embodiments may use a trained recurrent neural network to determine a neural network result and determine whether the neural network result satisfies a neural network result threshold. In response to a determination that the neural network result satisfies the neural network result threshold, some embodiments may determine that the set of record values satisfy the set of criteria.

For example, some embodiments may use a second machine learning model that includes a recurrent neural network to determine whether the set of record values satisfies a set of alert criteria. Additionally, some embodiments may use a second machine learning model that includes the use of a plurality of neural networks or uses a neural network(s) in combination with other operations. For example, some embodiments may implement a graph convolutional neural network to determine an intermediate neural network result(s) based on a subgraph determined using one or more operations described above and then use a recurrent neural network to determine an output neural network result based on the intermediate neural network result(s). In some embodiments, these operations may be combined in the form of a recurrent graph neural network.

Some embodiments may analyze changes in a graph and use those changes to consider whether or not the set of record values satisfy the set of alert criteria. For example, as described above, some embodiments may determine a subgraph by traversing a set of paths on a graph that are determined by in path distance threshold. Some embodiments may store versions of the subgraph for a node representing a record and use the subgraph or updates to the subgraph over time as inputs for the decision model used to determine whether the set of alert criteria is satisfied. By using the first set of record values of a subgraph with an earlier set of record values of an earlier version of the subgraph, some embodiments may detect time-sensitive anomalies for a record.

Some embodiments may use other decision models to determine whether or not the set of record values satisfy a set of criteria that indicates the record as an anomaly, such as a rule-based system to determine if the record value satisfies the set of criteria. For example, some embodiments may implement a rule that assigns the category value "type3" to a first record and determine that the first record satisfies the set of criteria based on a determination that at least one record within a path distance threshold of the first record in a records graph is labeled with the category value "type3." In some embodiments, the rule-based method may perform additional computations based on values of a record. For example, some embodiments may label a record as an anomaly based on a determination a sum of the quantitative values of a plurality of transactions of a first transaction type is greater than a sum threshold.

Some embodiments may collect different sets of values for analysis, where each respective set of the different sets of values may share a data type or other feature. For example, some embodiments may determine that a set of associated records of a first record includes three records. Some embodiments may then obtain a first set of scores associated with a first transaction type from the set of three records and a second set of scores associated with a second transaction type from the same set of three records. For example, some embodiments may collect six different scores associated with a transaction type labeled "credit" and four different scores associated with a transaction type labeled "debit." As discussed further below, some embodiments then compute a first sum of the set of six scores, compute a second sum of the set of four scores, and determine whether either the first or second sum is equal to or greater than a sum threshold when determining whether the set of values satisfy a set of criteria indicating an anomaly. In response to a determination that the record values satisfy the set of criteria, some embodiments may proceed to operations described by operation 724. Otherwise, operations of the process 700 may proceed to operations described for the operation 728.

In an operation 724, an alert message may be sent. The alert message may include a warning indicating that one or more of the set of alert criteria has been satisfied. The alert message may be sent to a user account, alert database, email address, other electronic message address, etc. For example, some embodiments may send an alert message indicating that a user account record is being labeled with the category value "conductor" to a manager UI.

In an operation 728, an indication of whether the record value satisfies the set of criteria may be stored. The indication of whether the record value satisfies the set of criteria may be stored in a server, on a cloud computing database, a storage memory device of a client computing device, etc. Some embodiments may send one or more messages to an API of a server or other computing device, where the message may be encrypted before being sent to the API. For example, some embodiments may perform operations that include encrypting a set of record values indicated to have satisfied the set of criteria using a public-key encryption method.

As described elsewhere in this disclosure, some embodiments may store the record value in a record of a database capable of providing responses to events in real-time. For example, some embodiments may update an associated aggregation record stored in a real-time aggregation database, where some embodiments may use a reversed key determined from a transaction value to retrieve the associated aggregation record. Furthermore, some embodiments may store the aggregation record or an associated record in a distributed cache, where some embodiments may determine which aggregation records to store in a cache based on an indicated anomaly of the aggregation record.

FIG. 8 shows a flowchart of operations to update a record and send values of the updated record to a destination application program interface, in accordance with one or more embodiments. In an operation 804, an update message indicating an update to a first database is obtained. An update message may include an update to a database may be obtained in various ways, such as via an API or a user interface capable of sending requests to the first database. For example, obtaining an update message may include obtaining a database transaction request at a first API of the first database, where the database transaction request may cause a change to a score of a record of the first database. The database transaction may include, be identified by, or otherwise be associated with a first transaction identifier that is or otherwise includes a string of quantitative values. For example, a database transaction request including the transaction identifier "12345" may be received by a listener process that performs a database transaction indicated by the database transaction request and also provides a version of the database transaction request to a set of other processes to perform one or more operations described in this disclosure. Alternatively, or in addition, some embodiments may obtain an update message that is different from an update command itself, such as a provided by an event listener indicating that a transaction request has been obtained.

In an operation 808, the first database may be accessed based on the transaction request. Some embodiments may access the first database via a second API to store a record of the transaction. In some embodiments, the first database may be or include a transactions database that keeps track of database transactions for a set of databases, such as an account database. For example, some embodiments may access a sequential transactions database to score a transaction entry in the sequential transactions database based on the database transaction request, where the transactions may be ordered by a time associated with the occurrence of the transaction. Various to update a transaction entry in a database may include saving a transaction, updating a transaction, or permitting the completion of a transaction.

As described elsewhere in this disclosure, some embodiments may reverse an identifier of a transaction to obtain a reversed key that points to an account record or a record associated with the account record, such as a transaction aggregation record that includes values of the transaction. For example, a database transaction may be associated with the transaction identifier "12345." Some embodiments may then determine a reversed key "54321" by reversing the transaction identifier. As described elsewhere in this disclosure, by reversing the index value, some embodiments may increase the efficiency of computer memory access by ensuring that different sections of a memory block are accessed even when data associated with sequential transactions are being obtained. If a history of transactions is retrieved or updated, some embodiments may lock one or more transaction records or user account records to prevent other functions from modifying the value(s) of the record before the retrieval or update operation is performed. Some embodiments may increase the efficiency of this process by ensuring that sequential transactions correspond with a record stored in separate memory blocks and thus increasing the efficiency of a set of record lock or unlock operations.

In some embodiments, a transaction may include an identifier that may be separated into a set of identifier portions, where one or more of the identifier portions may be reversed independently. For example, a transaction identifier may include the first sequence, "123456789ABCDEF." Some embodiments may segment the first sequence into a first identifier portion, "123456789," and a second identifier portion, "ABCDEF." Some embodiments may then generate a first reversed key by reversing the first identifier portion into the sequence "987654321" and a second reversed key by reversing the second identifier portion into the sequence "FEDCBA." As discussed elsewhere in this disclosure, some embodiments may then use both the first and second identifier portions to retrieve a record that is indexed both identifiers. Alternatively, some embodiments may reverse a first identifier portion without reversing another identifier portion. For example, some embodiments may reverse the first identifier portion "123456789" into the reverse index "987654321" without reversing the second identifier portion "ABCDEF."

In some embodiments, the record may be accessed from a UI, such as a UI of a case management application. For example, after receiving a database transaction request, some embodiments may update a database record based on the database transaction request or send the database transaction request to a case management application. Some embodiments may then display values of the database transaction request on a UI of the case management application. As further described below, some embodiments may then modify one or more values of the transaction request. Alternatively, some embodiments may stop the transaction request or generate a flag for the account records identified by or otherwise associated with the transaction request.

In an operation 812, a determination of whether a second database includes a record indexed by the index key of the transaction request is made. Some embodiments may access a third API that connects to an aggregation database to determine whether an aggregation database includes any transaction aggregation records indexed by the index key. As described elsewhere in this disclosure, the index key may be a reversed key, which may be obtained by reversing an identifier stored in association with the transaction request.

In some embodiments, the aggregation database may be an independent database or set of records. Alternatively, or in addition, the aggregation database may be part of or include another database, such as an account database. Alternatively, some embodiments may use another database, such as the aggregation database as an aggregation database by updating a value of the aggregation database with an aggregated value. For example, some embodiments may use an aggregation database to retrieve a feature, updating a record value of the aggregation database with an aggregated value, etc.

In some embodiments, the aggregation database or another database described in this disclosure may be accessed by accessing an API of a microservice instance. The microservice instance may include functionality to determine whether a set of criteria are satisfied or obtain an indication that the set of criteria are satisfied. For example, some embodiments may determine whether a transaction aggregation record satisfies a set of criteria indicating an anomaly and, if satisfied, update the transaction aggregation record. Alternatively, or in addition, some embodiments may use a microservice to generate verification messages based on a set of values. For example, some embodiments may provide a microservice instance with values of an aggregation record via an API of the microservice instance, such as a score change to the record, a history of previous score changes to the aggregation record based on a set of updates, or another set of values. In response to being provided with the input values, the microservice instance may output a set of outputs indicating whether the aggregation record comprising at least one of the input values should be categorized as an anomaly.

As discussed elsewhere in this disclosure, maintaining the aggregation database may include complexities related to corrections or modifications to previous entries and the generation of new associations with respect to a record or value of the aggregation database. Moreover, a plurality of operations may attempt to access the aggregation database concurrently, many of which may lock portions of the quantities database until the operation causing the lock is completed. These operations may frequently update transactions that are close to each other in time and thus likely to cause access delays or other issues. By reversing an index key that is often generated in sequence, different portions of a database or other data structure may be isolated from each other while containing values that are close together in sequence in another indexing system.

If a determination is made that the second database includes a record indexed by the index key determined from the transaction request, some embodiments may proceed to operations described by the operation 816. Otherwise, operations may proceed to operations described by the operation 820.

In an operation 816, a transaction aggregation record may be generated and stored in the second database. Storing a transaction aggregation record may include generating a record as the transaction aggregation record and determining a transaction aggregation value, where the transaction aggregation value is included in the transaction aggregation record. As described elsewhere in this disclosure, a transaction aggregation value may be a computed result of a function such as a sum, a weighted sum, a product, or some other value. In some embodiments, an initial value for an aggregated value of a transaction aggregation record may be used directly as the aggregated value without additional transformations of the initial value. Alternatively, or in addition, some embodiments may transform the initial value, such as by normalizing the initial value, approximating the initial value to a binned value, determining and storing a category value as the aggregated value based on the initial value, etc.

In some embodiments, the transaction aggregation record may be generated in a SQL database, where the index of the transaction aggregation record is the reversed key determined from the transaction record using one or more of the operations described above. Alternatively, a transaction aggregation record may be stored in a NoSQL database such as a key-value data store. For example, some embodiments may generate a transaction aggregation record in an Amazon AWS DynamoDB database.

In some embodiments, the transaction aggregation record may be generated using multiple transaction identifiers, where each transaction identifier may correspond with a different identification level. For example, some embodiments may store a transaction aggregation record using a multi-level indexing system. As described elsewhere in this disclosure, some embodiments may reverse multiple identifiers or independently reverse a plurality of identifier portions segmented from an initial identifier. Some embodiments may then generate a record that is indexed by both the first reversed key in a first index level and a second record that is indexed by a second index level.

Alternatively, or in addition, some embodiments may store a transaction aggregation value in an existing record of a database. For example, after a determination that an account record does not include an aggregated value, some embodiments may include an initial value of a transaction record two the account record. Furthermore, some embodiments may store a record of a database transaction or values used to perform the database transaction in a long-term storage database. The long-term storage database may include a set of historical records for database transactions that are not present in shorter-term storage databases, such as a distributed cache. For example, some embodiments may store a transaction record indicating a database transaction in both a distributed cache and in a long-term object data store to store historical records such that at least one historical record indicates a transaction that occurred on a date before any transaction indicated by the records stored in the distributed cache had occurred.

In an operation 820, a record of the second database is obtained based on the reversed key. In some embodiments, the reversed key may be used to retrieve a transaction aggregation record. As described elsewhere in this disclosure, by reconstructing the reversed key from an identifier obtain in association with a transaction, some embodiments may reduce the time used to search through an aggregation database and retrieve a transaction aggregation record associated with the transaction.

Some embodiments may reduce the time required to retrieve the record by storing the record in a cache memory, as opposed to persistent memory. Some embodiments may store data in cache memory of a distributed computing system, where the cache memory itself may be a distributed cache memory. Some embodiments may select specific records for storage in the distributed cache memory or store reduced-data versions of the record in a distributed cache memory to reduce the amount of data stored in a distributed cache memory. For example, using one or more operations described for the operation 708, some embodiments label a first account record with the category value "type1" and a second account record with the category value "type2", and, in response, store the first account record in a non-cache memory and store the second account record in the distributed cache memory.

In an operation 824, a value of the obtained record may be updated with values of a set of associated records associated with the obtained record. A value of an obtained record may be updated by associating the value of the obtained record with a set of other values obtained from the set of associated records. In some embodiments, the obtained record may be updated based on values of the set of associated records. Alternatively, or in addition, some embodiments may store value(s) of the obtained record in conjunction with values of the set of associated records in non-persistent memory storage to be validated or sent to a destination API, as further described below.

A value of a retrieved transaction aggregation record may be collected in association with a name, account creation date, or transaction category that is retrieved from an account record associated with the retrieved transaction aggregation record. Alternatively, or in addition, the value of the retrieved transaction aggregation record that maps to or is otherwise associated with a first account record may be collected with values of other transaction aggregation records. In some embodiments, the other transaction aggregation records may be mapped to or otherwise associated with other account records connected to the first account record. For example, some embodiments may use one or more of the operations described above to select a path distance threshold of a plurality of path distance thresholds for a first account record and determine a set of associated account records within the path distance threshold of the first account record in a graph. Some embodiments may then retrieve transaction aggregation values associated with the set of associated account records to update the first obtained record or a value of the first obtained record.

In an operation 832, a determination may be made if whether a set of criteria indicating an anomaly is satisfied based on the updated record. As described elsewhere in this disclosure, some embodiments may validate an obtained record based on a set of criteria. Operations to validate the retrieved criteria may be similar to operations described for the operation 720. In some embodiments, the first set of criteria may be or otherwise include a set of criteria that, upon satisfaction, may cause a message to be sent to an API indicating that a record should be deleted, discarded, or marked as obsolete.

Some embodiments may implement a rule-based system to determine if the transaction aggregation value is greater than a transaction aggregation threshold, such as 10,000. A determination that the transaction aggregation value is greater than 10,000 may cause a determination that the set of criteria is satisfied. Alternatively, or in addition, the implementation of the rule-based system may include a determination of whether a first transaction aggregation value and other transaction aggregation values associated with the first transaction aggregation value are greater than or equal to a transaction aggregation threshold.

As described elsewhere in this disclosure, some embodiments may associate a record with a category value that indicates that the record satisfies the set of criteria if an adjacent record is already assigned with the category value. For example, some embodiments may determine that a first record should be labeled with a category value "anomaly1" using one or more operations described in this disclosure. Some embodiments may then receive instructions to determine whether a second record should be labeled with the category value "anomaly1." Based on a determination that the second record is stored in association with the first record, (e.g., as adjacent records in a records graph or otherwise linked by at least one database transaction), some embodiments may label the second record with the category value "anomaly1."

In some embodiments, a transaction request or other update message may be obtained in the form of a structured message, such as an update message in the form of a JSON file format indicating data fields and their corresponding values. Some embodiments may use the format of the structured message to determine whether one or more specific data field of the structured message triggers one or more criteria, where a triggered criterion may indicate a data field that is missing a corresponding value or is filled with an erroneous value. For example, after receiving a structured update message "{transactID: "12345abcd", giver: "900us", taker: "900mx"}, some embodiments may determine that the structured update message is incorrect based on a criterion requiring that a giver amount and a taker amount be equal. In response to a determination that an indicated data field is erroneous or missing, some embodiments may then send an alert to a user account that identifies the indicated data field. Alternatively, or in addition, some embodiments may replace or augment the missing or erroneous values with a default set of values to increase computational efficiency.

In some embodiments, an update message may include a plurality of aggregated values, where a first aggregated value may be associated with a first category and a second aggregated value may be associated with a second category. For example, a first aggregated value may be associated with a first transaction type "credit" and a second aggregated value may be associated with a second transaction type "debit." Some embodiments may determine that the first aggregated value is greater than or equal to a first threshold corresponding to the first transaction type and that the second aggregated value is greater than or equal to a second threshold corresponding to the second transaction type, even if a sum of a previous set of transaction requests of either the first or second transaction type did not previously satisfy either the first or second thresholds, respectively. As further described below, some embodiments may update an aggregation record in response to a determination that either or both of the first and second thresholds are satisfied. A determination that the updated record satisfies the set of record obsolescence criteria may cause operations of the process 800 proceed to operations described for the operation 840. Otherwise, operations of the process 800 may proceed to operations described for the operation 844.

In an operation 840, some embodiments may indicate the record is anomalous. In some embodiments, the indication that the record is anomalous may be used to update a record, as further described below. Alternatively, or in addition, some embodiments may perform additional operations in response to a determination that the record is categorized with a category value indicating an anomaly. For example, some embodiments may label the transaction aggregation record with a category value indicating that a previous version of the transaction aggregation record is obsolete. For example, after a determination that an account record is associated with a transaction aggregation value that is greater than 10,000, some embodiments may set a variable of the account record to "obsolete." As described elsewhere in this disclosure, this may result in the deletion or discarding of a version of the account record or other record.

Some embodiments may further update other data stores to indicate an anomaly. For example, some embodiments may send a message to a destination API indicating that a previous version of a transaction aggregation record or a corresponding account record is obsolete. By sending a message indicating record obsolescence, some embodiments may prevent double analysis or inaccurate analysis of the data performed by a system receiving the message. Alternatively, or in addition, some embodiments may send an updated version of the transaction aggregation record and, upon a determination that the updated version of the transaction aggregation record is different, some embodiments may automatically flag the previous version of the transaction aggregation record as obsolete. Furthermore, as described elsewhere in this disclosure, a set of criteria may include a plurality of thresholds or other criteria, and some embodiments may indicate which of the thresholds or other criteria are satisfied. For example, some embodiments may determine that a first and second thresholds are satisfied by values of an aggregation record. In response, some embodiments may concurrently or sequentially update an aggregation record by storing the first and second aggregation values in the aggregation record along with an indicator(s) that the values for both the first and second transaction types are anomalous.

In an operation 844, some embodiments may send the updated record to a destination API. Some embodiments may re-format the updated record before sending the record to the destination API. Some embodiments may generate a document based on the updated record by filling fields of the document with values of the updated record. For example, some embodiments may generate a CTR document based on the updated record and send the CTR document to the destination API. Alternatively, or in addition, some embodiments may change the units, change the order by which values of the updated record are stored or displayed, remove certain fields, or add certain fields to a set of values of the updated record that are to be sent to the destination API.

In some embodiments, the various computers and subsystems illustrated in FIG. 1 may include one or more computing devices that are programmed to perform the functions described herein. The computing devices may include one or more electronic storages (e.g., e.g., database(s) 132, which may include training database(s) 134, transactions database(s) 136, account database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The network(s) 150 may include a network operating over the Internet, a mobile phone network, a mobile voice or data network (e.g., a 4G or LTE network), a cable network, a public switched telephone network, or other types of communications network or combinations of communications networks. The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the set of processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" etc. refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: obtaining a database transaction request associated with a first transaction identifier via a first API, wherein the database transaction request comprises a first value; accessing a second API of a sequential transactions database to store a transaction entry in the sequential transactions database based on the database transaction request; generating a reversed key by reversing the first transaction identifier; accessing a third API of an aggregation database to determine whether the aggregation database comprises any transaction aggregation records indexed by the reversed key; in response to a determination that the aggregation database does not store any transaction aggregation records indexed by the reversed key, generating a transaction aggregation record comprising the first value in the aggregation database, wherein the transaction aggregation record is indexed with the reversed key in the aggregation database; obtaining an update message indicating an update to the sequential transactions database, wherein the update message comprises a second transaction identifier and a second value, and wherein the first API was not used to update the sequential transactions database; reversing the second transaction identifier to reconstruct the reversed key; searching the aggregation database with the reversed key to retrieve the transaction aggregation record; updating the transaction aggregation record based on the second value; and sending the transaction aggregation record to the destination API after updating the transaction aggregation record with the second value.

2. A method comprising: obtaining a transaction request associated with a first identifier via a first application program interface (API), wherein the transaction request comprises a first value; accessing a second API of a first database to store an entry in the first database based on the transaction request; determining a reversed key by reversing at least a portion of the first identifier; accessing a third API of a second database to determine whether any records indexed by the reversed key is stored in the second database; generating a record in the second database in response to a determination that the second database does not store any records indexed by the reversed key, wherein the record is indexed with the reversed key in the second database, and wherein the record comprises the first value; obtaining an update message indicating an update to the first database, wherein the update message comprises a second identifier and a second value; reversing at least a portion of the second identifier to reconstruct the reversed key; searching the second database with the reversed key to retrieve the record; updating the record based on the second value; and sending the record to a fourth API after updating the record based on the second value.

3. A method comprising: obtaining a transaction request associated with an identifier via a first application program interface (API), wherein the transaction request comprises a first value; accessing a first database to store an entry in the first database based on the transaction request; determining an index key by reversing at least a portion of the identifier; generating a record in a second database based on the first value, wherein the record is indexed with the index key in the second database; obtaining an update message indicating an update to the first database, wherein the update message comprises a first update value and a second update value; reversing the first update value to reconstruct the index key; searching the second database with the index key to retrieve the record; updating the record based on the second update value; and sending the record to a second API of a server after updating the record based on the second update value.

4. The method of any of the preceding embodiments, wherein: accessing the third API comprises accessing a microservice instance of the aggregation database; generating the transaction aggregation record comprises generating a first version of the transaction aggregation record; updating the transaction aggregation record comprises generating a second version of the transaction aggregation record; determining whether the second version of the transaction aggregation record satisfies a set of criteria; sending a first message comprising an identifier of the first version of the transaction aggregation record to the microservice instance in response to a determination that the transaction aggregation record satisfies the set of criteria; and the first message comprises the reversed key and indicates that the first version of the transaction aggregation record is obsolete.

5. The method of any of the preceding embodiments, wherein sending the first message further comprises preventing further reading or updating values of the first version of the transaction aggregation record stored in the aggregation database until the first version of the transaction aggregation record is indicated as obsolete.

6. The method of any of the preceding embodiments, wherein: the database transaction request is obtained in association with a first transaction type; the transaction aggregation record comprises a first indicator indicating that the first value is associated with the first transaction type; the transaction aggregation record comprises a first aggregated value based on the first value associated with the first transaction type, the first aggregated value being greater than or equal to the first value; obtaining the update message comprises determining a second aggregated value; the second aggregated value is greater than or equal to a sum of a set of values of a second set of transaction requests categorized as a second transaction type; and updating the transaction aggregation record comprises storing the second aggregated value in the transaction aggregation record in association with the second transaction type.

7. The method of any of the preceding embodiments, further comprising: associating the record with a category value in the second database, wherein the category value indicates that the record satisfies a set of criteria; determining whether the record is stored in association with the category value; and sending the record to the fourth API in response to a determination that the record is associated with the category value in the second database.

8. The method of any of the preceding embodiments, further comprising: sending the record to a fifth API of a microservice instance, wherein an execution of the microservice instance comprises determining whether values of the record satisfies a set of criteria; receiving a verification message from the microservice instance indicating that the record satisfies the set of criteria; and sending the record to the fourth API in response to receiving the verification message.

9. The method of any of the preceding embodiments, wherein the record is a first record, and wherein the transaction request is a first transaction request, further comprising: obtaining a second transaction request; generating a second record based on the second transaction request; sending the second record to the fifth API; receiving a second message from the microservice instance indicating that the second message does not satisfy the set of criteria; and sending an alert to a user account indicating that the second record does not satisfy the set of criteria.

10. The method of any of the preceding embodiments, further comprising: determining whether the set of criteria has been updated, wherein the set of criteria have been updated after the record was sent to the fifth API; and re-sending the record to the fifth API based on a determination that the set of criteria has been updated.

11. The method of any of the preceding embodiments, wherein the second database comprises a key-value data store.

12. The method of any of the preceding embodiments, further comprising caching a set of values of the record in a distributed cache memory, wherein retrieving the record comprises retrieving the set of values from the distributed cache memory.

13. The method of any of the preceding embodiments, further comprising: receiving a structured message indicating that the record does not satisfy a set of criteria; determining a data field of the record associated with a failure to satisfy the set of criteria based on the structured message; and sending an alert to a user account, wherein the alert identifies the data field.

14. The method of any of the preceding embodiments, wherein the reversed key is a first reversed key, further comprising: wherein the first identifier comprises a first identifier portion and a second identifier portion; determining the reversed key comprises reversing the first identifier portion to determine the first reversed key and reversing the second identifier portion to determine a second reversed key; and searching the second database comprises: searching the second database using the first reversed key; and searching the second database using the second reversed key.

15. The method of any of the preceding embodiments, further comprising: selecting a first user account based on the transaction request; determining an entity account associated with the first user account, wherein a plurality of accounts is permissioned to update a quantitative field of the entity account, and wherein the plurality of user accounts comprises the first user account; determining a sum of values by summing a set of transaction values, wherein the set of transaction values is associated with the plurality of accounts, and wherein the set of transaction values comprises the first value; determining whether the sum of values satisfies a threshold, wherein generating the record comprises generating the record in response to a determination that the sum of values satisfies the threshold.

16. The method of any of the preceding embodiments, further comprising: selecting a user account based on the transaction request; retrieving a node of a graph based on the user account, wherein each respective node of a plurality of nodes of the graph is associated with a respective account; determining a plurality of accounts based on the node; determining a sum of values by summing a set of transaction values, wherein the set of transaction values is associated with the plurality of accounts, and wherein the set of transaction values comprises the first value; and determining whether the sum of values satisfies a threshold, wherein generating the record comprises generating the record in response to a determination that the sum of values satisfies the threshold.

17. The method of any of the preceding embodiments, further comprising: determining whether the record indicates an anomaly by providing a set of values of the record to a neural network model as an input; associating the record with an anomaly indicator in response to a determination that the record indicates the anomaly; and sending instructions comprising the set of values to a client computing device, wherein the instructions causes the client computing device to display the set of values.

18. The method of any of the preceding embodiments, further comprising sending the record to a third database, wherein the third database stores a history of records that comprises historical records indicating database transactions that occurred on a date before any transactions indicated by records stored in the second database.

19. The method of any of the preceding embodiments, further comprising: obtaining a second transaction request associated with a second identifier via the first API, wherein the transaction request comprises a third value; and determining whether a first sum comprising the first value and the third value is greater than a threshold, wherein generating the record in the second database comprises generating the record in response to a determination that the first sum is greater than the threshold.

20. The method of any of the preceding embodiments, wherein updating the record comprises adding the first value to the second update value.

21. A non-transitory, computer-readable media storing instructions that, when executed by one or more processors, effectuate operations comprising those of any of embodiments 1 to 20.

22. A system comprising: one or more processors; and memory storing instructions that, when executed by the processors, cause the processors to effectuate operations comprising those of any of embodiments 1 to 20.

23. A method comprising: detecting a record update related to an account; obtaining, based on a record update, an account record that identifies the account, wherein the record update indicates the account record and at least one other account record; providing an update history stored in the account record to a first machine learning model to assign a category value of a plurality of categories to the account record; obtaining a records graph comprising a node mapping to the account record, wherein a graph edge associating adjacent nodes of the records graph indicates a set of updates identifying the adjacent nodes or a shared identifier between the adjacent nodes; selecting a first path distance threshold of a plurality of path distance thresholds based on the category value, wherein the first path distance threshold is less than a second path distance threshold of the plurality of path distance thresholds; traversing the records graph via a set of paths to select a set of nodes of the records graph, such that 1) each respective path of the set of paths begins at the node mapping to the account record and 2) a maximum path distance of the set of paths is less than or equal to the first path distance threshold; determining a set of record values associated with the set of nodes, wherein each respective value of the set of record values is stored in a respective record identified by a respective node of the set of nodes; providing the set of record values to a second machine learning model to determine whether the record update satisfies a set of criteria; and storing the record update in an aggregated set of record updates in response to a determination that the record update satisfies the set of criteria.

24. A method comprising: detecting a record update associated with a first record; obtaining a first set of records that are associated with each other in a data structure, wherein the first set of records comprises the first record; determining a distance threshold based on record values stored in association with the first record using a machine learning model; selecting a second set of records of the first set of records based on the first record and the distance threshold, wherein each respective record of the second set of records is within the distance threshold from the first record; determining a set of values associated with the second set of records, wherein each respective value of the set of values is associated with a respective record of the second set of records; providing the set of values to a decision model to determining whether the record update satisfies a set of criteria; and storing an indication that the record update satisfies the set of criteria.

25. A method comprising: detecting a record update; retrieving a record associated with the record update; determining a category value of a plurality of categories based on the record using a machine learning model; selecting a distance threshold of a plurality of distance thresholds based on the category value; obtaining a data structure comprising a first set of records, wherein the first set of records comprises the record; selecting a second set of records of the first set of records based on the record and the distance threshold by using associations encoded in the data structure, wherein each respective record of the second set of records is bounded by the distance threshold from the record; determining a set of values associated with the second set of records, wherein each respective value of the set of values is associated with a respective record of the second set of records; providing the set of values to a decision model to determine whether the record update satisfies a set of criteria; and storing an indication that the record update satisfies the set of criteria based on a determination that the record update satisfies a set of criteria.

26. The method of any of embodiments 23 to 25, wherein the category value is a first category value, and wherein the record update is a first record update, and wherein the update history is a first update history, and wherein the account record is a first account record, and wherein the node mapping to the account record is a first node, and wherein the set of nodes is a first set of node, and wherein the set of record values is a first set of record values, and wherein the set of paths is a first set of paths, the operations further comprising: detecting a second record update to a second user; obtaining, based on the second record update, a second account record that identifies the second user; providing a second update history stored in the second account record to the first machine learning model to assign a second category value of the plurality of categories to the second account record, wherein the second category value is different from the first category value; selecting the second path distance threshold of the plurality of path distance thresholds based on the second category value; traversing the records graph via a second set of paths to select a second set of nodes, such that 1) each respective path of the second set of paths begins at a second node mapping to the second account record, 2) a maximum path distance of the second set of paths is less than or equal to the second path distance threshold, and 3) the path distance between at least one node of the second set of nodes and the second node is greater than the path distance between any node of the first set of nodes and the first node; determining a second set of record values associated with the second set of nodes; and providing the second set of record values to the second machine learning model to determine whether the second record update satisfies the set of criteria.

27. The method of any of embodiments 23 to 26, wherein determining the second category value comprises: determining whether the second record update identifies a record already labeled with the second category value; based on a determination that the second record update identifies the record already labeled with the second category value, providing the first machine learning model with an input value indicating that the second record update identifies the record already labeled with the second category value; and assigning the second category value to the second account record.

28. The method of any of embodiments 23 to 27, wherein the set of record values is a first set of record values, and wherein providing the set of record values to the second machine learning model comprises: selecting a neural network model of a plurality of neural network models based on the category value, wherein the neural network model comprises a graph convolutional network and a recurrent neural network; obtaining a subgraph, wherein the subgraph comprises identifiers of the set of nodes and a set of graph edges connecting the set of nodes; obtaining an earlier set of record values associated with the set of nodes, wherein the earlier set of record values does not include a record value of the first set of record values; providing the subgraph, the first set of record values and the earlier set of record values to the neural network model to determine whether the record update satisfies the set of criteria.

29. The method of any of embodiments 23 to 28, wherein the machine learning model comprises a feed forward neural network.

30. The method of any of embodiments 23 to 29, wherein the record is a first record, and wherein selecting the second set of records comprises: selecting a second record that is indicated by an indicator as being associated with the first record, wherein the second record is indicated to have been updated with a score-changing record update that identifies the first record; incrementing a counter by one; and determining whether the counter satisfies the distance threshold.

31. The method of any of embodiments 23 to 30, wherein the record is a first record, the operations further comprising: determining a distance between a second record and the first record in a feature space of the first record and the second record; determining whether the distance satisfies the distance threshold; and include the second record to the second set of records based on a determination the distance satisfies the distance threshold.

32. The method of any of embodiments 23 to 31, wherein determining that the record update satisfies the set of criteria comprises: determining a sum of at least some values of the set of values; determining whether the sum is less than a sum threshold, wherein satisfying the set of criteria comprises determining that the sum is less than the sum threshold.

33. The method of any of embodiments 23 to 32, wherein, for each respective value of the set of values: the respective value is associated with a respective record update; the respective value indicates an increase in a score associated with the record in response to the respective record update; and the operations comprise: determining whether the respective record update has occurred after a time threshold; and including the respective value in the set of values based on a determination that the respective record update has occurred after the time threshold.

34. The method of any of embodiments 23 to 33, wherein the distance threshold is a first distance threshold, and wherein the record update is a first record update, and wherein the category value is a first category value, the operations further comprising: retrieving a second record associated with a second record update; determining a second category value of the plurality of categories based on data associated with the second record, and wherein the second category value is different form the first category value; selecting a second distance threshold of the plurality of distance thresholds based on the second category value; selecting a third set of records of the first set of records based on the second record and the distance threshold, wherein each respective distance between the second record and a respective record of the third set of records is within the distance threshold; determining a second set of values associated with the third set of records, wherein each respective value of the second set of values is associated with a respective record of the third set of records; and providing the second set of values to the decision model to determine whether the second record update satisfies the set of criteria.

35. The method of any of embodiments 23 to 34, wherein: determining the second category value comprises determining that a first user identified by the second record has had at least one record update identifying a second user; the second user is identified by a third record; the second user is indicated to have been update with a plurality of record updates that also identify a third user within a duration threshold; and a count of the plurality of record updates is greater than a count threshold.

36. The method of any of embodiments 23 to 35, wherein providing the set of values to the decision model comprises: providing the set of values to a neural network of the decision model to determine a neural network result; determining whether the neural network result satisfies a neural network result threshold; and generating an alert based on a determination that the neural network result satisfies the neural network result threshold.

37. The method of any of embodiments 23 to 36, wherein determining the category value comprises: determining whether the record is flagged by any indicator of a set of indicators; and determining that the category value based on a determination that the record is not flagged by any indicator of the set of indicators.

38. The method of any of embodiments 23 to 37, the operations further comprising: generating a message comprising the indication that the record update satisfies the set of criteria; encrypting the message; and sending the message to an application program interface (API) of a server.

39. The method of any of embodiments 23 to 38, wherein determining the distance threshold comprises: determining whether a first value of the record values satisfies a second set of criteria; and based on a determination that the first value satisfies the second set of criteria, modify the distance threshold from an initial value to a different value.

40. The method of any of embodiments 23 to 39, wherein each respective record of the first set of records represents a respective record update, and wherein each respective record is associated with a set of identifiers corresponding with accounts participating in the respective record update.

41. The method of any of embodiments 23 to 40, further comprising: in response to a determination that the record update satisfies the set of criteria, updating a profile score associated with the first record; and determining whether the profile score satisfies a score threshold after updating the profile score.

42. The method of any of embodiments 23 to 41, further comprising: accessing a first application program interface (API) of a first database to retrieve an aggregation record; updating the aggregation record based on the record update; and sending the aggregation record to a second API after updating the aggregation record.

43. A non-transitory, computer-readable media storing instructions that, when executed by one or more processors, effectuate operations comprising those of any of embodiments 23 to 42.

44. A system comprising: one or more processors; and memory storing instructions that, when executed by the processors, cause the processors to effectuate operations comprising those of any of embodiments 23 to 42.

What is claimed is:

1. A system for dynamically scaling the number of inputs for a machine learning model comprising one or more memory devices storing instructions and one or more processors configured to execute the instructions that, when executed, cause operations comprising:
   detecting a record update related to an account;
   obtaining, based on a record update, an account record that identifies the account, wherein the record update indicates the account record and at least one other account record;
   providing an update history stored in the account record to a first machine learning model to assign a category value of a plurality of categories to the account record;
   obtaining a records graph comprising a node mapping to the account record, wherein a graph edge associating adjacent nodes of the records graph indicates a set of updates identifying the adjacent nodes or a shared identifier between the adjacent nodes;
   selecting a first path distance threshold of a plurality of path distance thresholds based on the category value, wherein the first path distance threshold is less than a second path distance threshold of the plurality of path distance thresholds;
   traversing the records graph via a set of paths to select a set of nodes of the records graph, such that 1) each respective path of the set of paths begins at the node mapping to the account record and 2) a maximum path distance of the set of paths is less than or equal to the first path distance threshold;

determining a set of record values associated with the set of nodes, wherein each respective value of the set of record values is stored in a respective record identified by a respective node of the set of nodes;

providing the set of record values to a second machine learning model to determine whether the record update satisfies a set of criteria; and storing the record update in an aggregated set of record updates in response to a determination that the record update satisfies the set of criteria.

2. The system of claim 1, wherein the category value is a first category value, and wherein the record update is a first record update, and wherein the update history is a first update history, and wherein the account record is a first account record, and wherein the node mapping to the account record is a first node, and wherein the set of nodes is a first set of node, and wherein the set of record values is a first set of record values, and wherein the set of paths is a first set of paths, the operations further comprising:

detecting a second record update to a second user;

obtaining, based on the second record update, a second account record that identifies the second user;

providing a second update history stored in the second account record to the first machine learning model to assign a second category value of the plurality of categories to the second account record, wherein the second category value is different from the first category value;

selecting the second path distance threshold of the plurality of path distance thresholds based on the second category value;

traversing the records graph via a second set of paths to select a second set of nodes, such that 1) each respective path of the second set of paths begins at a second node mapping to the second account record, 2) a maximum path distance of the second set of paths is less than or equal to the second path distance threshold, and 3) a path distance between at least one node of the second set of nodes and the second node is greater than any path distance between any node of the first set of nodes and the first node;

determining a second set of record values associated with the second set of nodes; and providing the second set of record values to the second machine learning model to determine whether the second record update satisfies the set of criteria.

3. The system of claim 1, wherein the set of record values is a first set of record values, and wherein providing the set of record values to the second machine learning model comprises:

selecting a neural network model of a plurality of neural network models based on the category value, wherein the neural network model comprises a graph convolutional network and a recurrent neural network;

obtaining a subgraph, wherein the subgraph comprises identifiers of the set of nodes and a set of graph edges connecting the set of nodes;

obtaining an earlier set of record values associated with the set of nodes, wherein the earlier set of record values does not include a record value of the first set of record values; and providing the subgraph, the first set of record values and the earlier set of record values to the neural network model to determine whether the record update satisfies the set of criteria.

4. The system of claim 2, wherein determining the second category value comprises:

determining whether the second record update identifies a record already labeled with the second category value;

based on a determination that the second record update identifies the record already labeled with the second category value, providing the first machine learning model with an input value indicating that the second record update identifies the record already labeled with the second category value; and assigning the second category value to the second account record.

5. A non-transitory, machine-readable medium storing instructions that, when executed by one or more processors, performs operations comprising:

detecting a record update;

retrieving a record associated with the record update;

determining a category value of a plurality of categories based on the record using a machine learning model, wherein the machine learning model comprises a feed forward neural network;

selecting a distance threshold of a plurality of distance thresholds based on the category value;

obtaining a data structure comprising a first set of records, wherein the first set of records comprises the record, wherein the record is a first record;

selecting a second set of records of the first set of records based on the record and the distance threshold by using associations encoded in the data structure, wherein each respective record of the second set of records is bounded by the distance threshold from the record, and wherein selecting the second set of records comprises:

selecting a second record that is indicated by an indicator as being associated with the first record, wherein the second record is indicated to have been updated with a score-changing record update that identifies the first record;

incrementing a counter by one; and determining whether the counter satisfies the distance threshold;

determining a set of values associated with the second set of records, wherein each respective value of the set of values is associated with a respective record of the second set of records;

providing the set of values to a decision model to determine whether the record update satisfies a set of criteria; and storing an indication that the record update satisfies the set of criteria based on a determination that the record update satisfies a set of criteria.

6. The non-transitory, machine-readable medium of claim 5, wherein the record is a first record, the operations further comprising:

determining a distance between a second record and the first record in a feature space of the first record and the second record;

determining whether the distance satisfies the distance threshold; and including the second record to the second set of records based on a determination the distance satisfies the distance threshold.

7. The non-transitory, machine-readable medium of claim 5, wherein determining that the record update satisfies the set of criteria comprises:
 determining a sum of at least some values of the set of values; and
 determining whether the sum is less than a sum threshold, wherein satisfying the set of criteria comprises determining that the sum is less than the sum threshold.

8. The non-transitory, machine-readable medium of claim 5, wherein the distance threshold is a first distance threshold, and wherein the record update is a first record update, and wherein the category value is a first category value, the operations further comprising:
 retrieving a second record associated with a second record update;
 determining a second category value of the plurality of categories based on data associated with the second record, and wherein the second category value is different form the first category value; selecting a second distance threshold of the plurality of distance thresholds based on the second category value;
 selecting a third set of records of the first set of records based on the second record and the distance threshold, wherein each respective distance between the second record and a respective record of the third set of records is within the distance threshold;
 determining a second set of values associated with the third set of records, wherein each respective value of the second set of values is associated with a respective record of the third set of records; and
 providing the second set of values to the decision model to determine whether the second record update satisfies the set of criteria.

9. The non-transitory, machine-readable medium of claim 5, wherein providing the set of values to the decision model comprises:
 providing the set of values to a neural network of the decision model to determine a neural network result;
 determining whether the neural network result satisfies a neural network result threshold; and
 generating an alert based on a determination that the neural network result satisfies the neural network result threshold.

10. The non-transitory, machine-readable medium of claim 5, wherein determining the category value comprises:
 determining whether the record is flagged by any indicator of a set of indicators; and
 determining that the category value based on a determination that the record is not flagged by any indicator of the set of indicators.

11. The non-transitory, machine-readable medium of claim 5, the operations further comprising:
 generating a message comprising the indication that the record update satisfies the set of criteria;
 encrypting the message; and
 sending the message to an application program interface (API) of a server.

12. The non-transitory, machine-readable medium of claim 7, wherein, for each respective value of the set of values:
 the respective value is associated with a respective record update;
 the respective value indicates an increase in a score associated with the record in response to the respective record update; and
 the operations comprise:
  determining whether the respective record update has occurred after a time threshold; and
  including the respective value in the set of values based on a determination that the respective record update has occurred after the time threshold.

13. The non-transitory, machine-readable medium of claim 8, wherein:
 determining the second category value comprises determining that a first user identified by the second record has had at least one record update identifying a second user;
 the second user is identified by a third record;
 the second user is indicated to have been update with a plurality of record updates that also identify a third user within a duration threshold; and
 a count of the plurality of record updates is greater than a count threshold.

14. A method comprising:
 detecting a record update associated with a first record;
 obtaining a first set of records that are associated with each other in a data structure, wherein the first set of records comprises the first record;
 determining a distance threshold based on record values stored in association with the first record using a machine learning model, wherein determining the distance threshold comprises:
  determining whether a first value of the record values satisfies a second set of criteria; and
  based on a determination that the first value satisfies the second set of criteria, modify the distance threshold from an initial value to a different value;
 selecting a second set of records of the first set of records based on the first record and the distance threshold, wherein each respective record of the second set of records is within the distance threshold from the first record;
 determining a set of values associated with the second set of records, wherein each respective value of the set of values is associated with a respective record of the second set of records;
 providing the set of values to a decision model to determining whether the record update satisfies a set of criteria; and
 storing an indication that the record update satisfies the set of criteria.

15. The method of claim 14, wherein each respective record of the first set of records represents a respective record update, and wherein each respective record is associated with a set of identifiers corresponding with accounts participating in the respective record update.

16. The method of claim 14, further comprising:
 in response to a determination that the record update satisfies the set of criteria, updating a profile score associated with the first record; and
 determining whether the profile score satisfies a score threshold after updating the profile score.

17. The method of claim 14, further comprising:
 accessing a first application program interface (API) of a first database to retrieve an aggregation record;
 updating the aggregation record based on the record update; and
 sending the aggregation record to a second API after updating the aggregation record.

* * * * *